United States Patent [19]

Nakayama et al.

[11] Patent Number: 5,363,507
[45] Date of Patent: Nov. 8, 1994

[54] METHOD AND SYSTEM FOR STORING AND RETRIEVING COLLABORATIVELY PROCESSED INFORMATION BY ASSOCIATED IDENTIFICATION DATA

[75] Inventors: Yoshiyuki Nakayama, Yokohama; Kenjiro Mori, Machida; Tadashi Yamamitsu, Hadano, all of Japan

[73] Assignee: Hitachi, Ltd., Tokyo, Japan

[21] Appl. No.: 743,851

[22] Filed: Aug. 12, 1991

[30] Foreign Application Priority Data

Aug. 13, 1990 [JP] Japan .................. 2-211711

[51] Int. Cl.⁵ ............ G06F 15/40; G06F 15/16; G06F 13/10; G06F 13/366
[52] U.S. Cl. .............. 395/800; 364/222.2; 364/222.3; 364/229.5; 364/231; 364/231.5; 364/237.2; 364/241.7; 364/240.7; 364/242.5; 364/281.7; 364/284.3; 364/284.4; 364/283.3; 364/286.2; 364/286.3; 364/DIG. 1; 364/DIG. 2
[58] Field of Search .............. 395/800, 650, 200, 425, 395/400, 250, 550, 500, 375, 325, 775, 700, 600, 275, 157, 100; 364/DIG. 1, DIG. 2, 401; 379/96, 93, 202, 54, 90

[56] References Cited

U.S. PATENT DOCUMENTS

| 4,654,483 | 3/1987 | Imai et al. ............... 379/54 |
| 4,656,654 | 4/1987 | Dumas .................. 379/86 |
| 4,714,989 | 12/1987 | Billings ................. 395/700 |
| 4,977,520 | 12/1990 | McGaughey, III et al. ....... 395/100 |
| 5,008,930 | 4/1991 | Gawrys et al. ............ 379/210 |
| 5,195,085 | 3/1993 | Bertsch et al. ........... 370/13 |
| 5,195,086 | 3/1993 | Baumgartner et al. ........ 379/202 |
| 5,208,912 | 5/1993 | Nakayama et al. .......... 395/200 |

FOREIGN PATENT DOCUMENTS

| 0170469 | 5/1986 | European Pat. Off. . |
| 0229232 | 2/1987 | European Pat. Off. . |
| 0319232 | 7/1989 | European Pat. Off. . |
| 64-13836 | 1/1989 | Japan . |
| 1-259451 | 10/1989 | Japan . |
| 1-261723 | 10/1989 | Japan . |
| 1-261775 | 10/1989 | Japan . |
| 1487507 | 10/1977 | United Kingdom . |

Primary Examiner—Alyssa H. Bowler
Assistant Examiner—Daniel H. Pan
Attorney, Agent, or Firm—Fay, Sharpe, Beall, Fagan, Minnich & McKee

[57] ABSTRACT

A collaborative information processing system is formed of a plurality of terminal units interconnected through a network. Each terminal unit includes a microprocessor provided with a control program for controlling the execution of various application programs and the communication with other terminal units, input-/output devices such as a display unit with a display screen and keyboard, and a telephone set. A plurality of users join in a conference or such a group work to create materials by making reference to a material which is displayed equally on the screen of each terminal unit and making conversation through the telephone set under control of the control program. Records of group work information including the outline of the group work, names of participants, and names of materials and data created or referenced during the group work or conference are stored automatically in a database so that the records can readily be retrieved in the future.

21 Claims, 21 Drawing Sheets

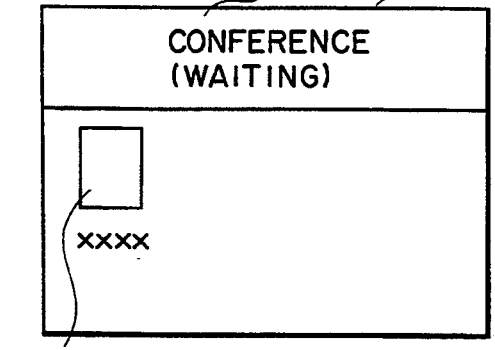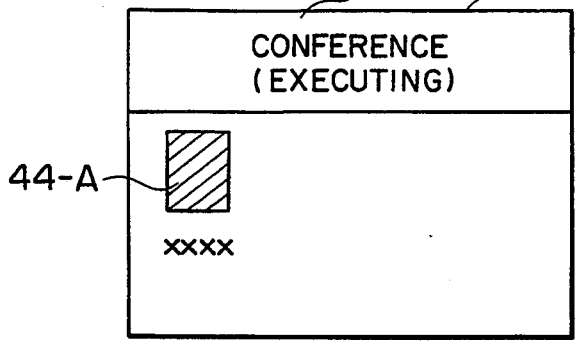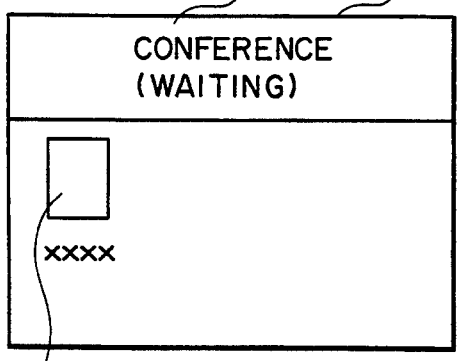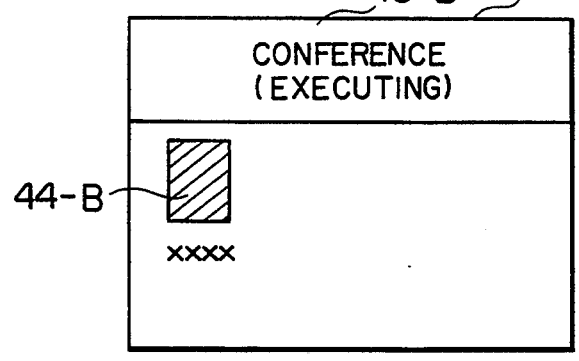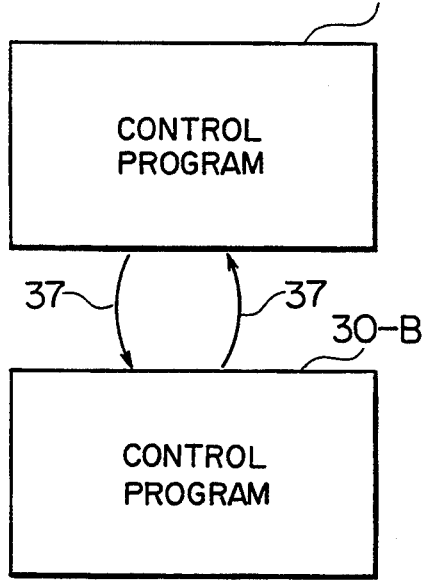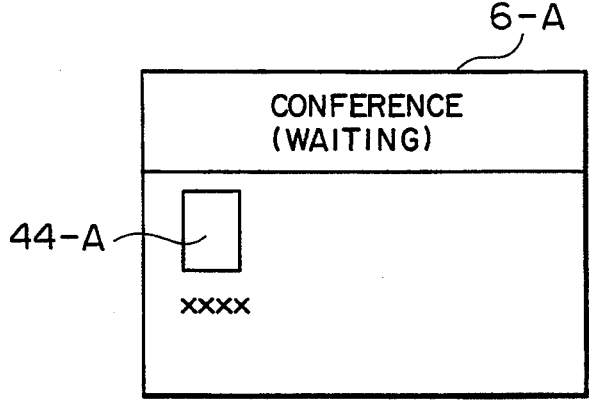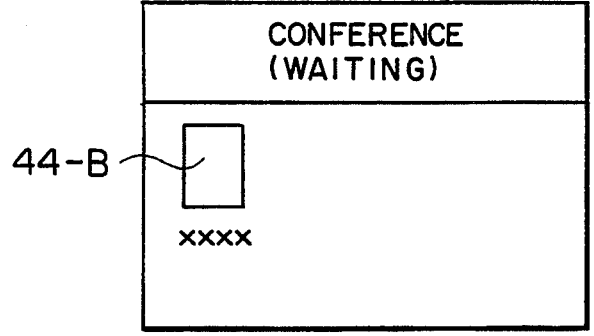

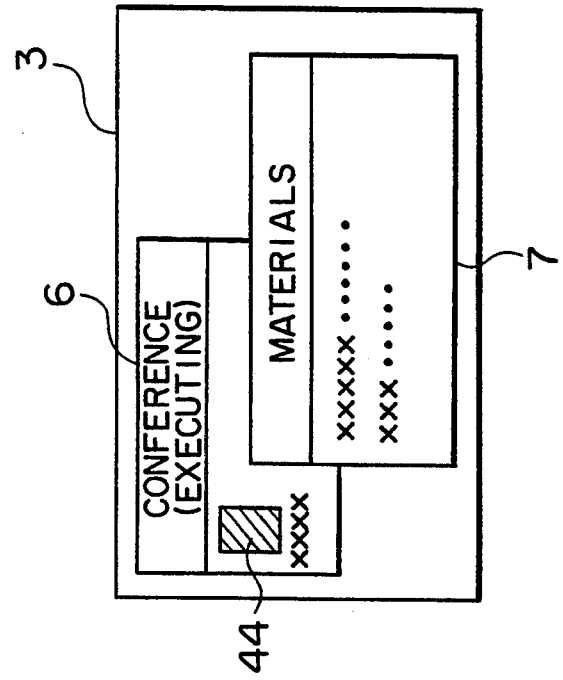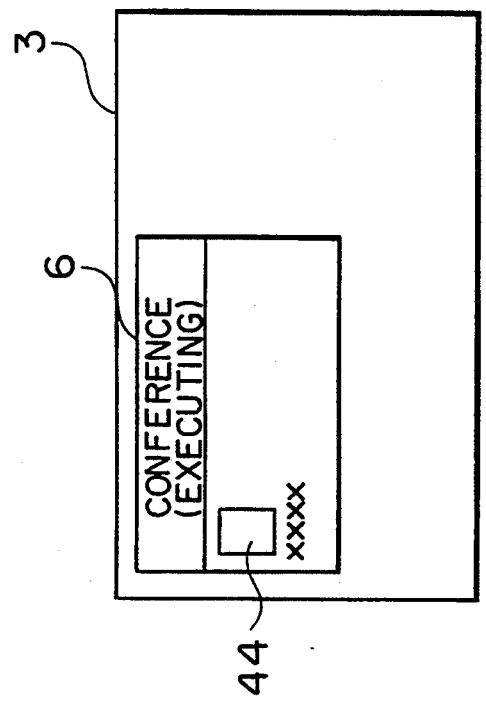

FIG. 10A
```
50 — TITLE      : xxxxx···
52 — DATE       : OCTOBER 10, 1990   AM. 10:00~10:30
54 — PARTICI-   : x.xxxxx    x.xxxx    x.xxxx
     PANTS
56 — MATERIAL   : xxxxxxxx, xxxxxxxx
```
(7)
FIG. 10B
```
50 — TITLE      : xxxxx···
52 — DATE       : OCT. 10, 1990   AM. 10:00~10:30
54 — PARTICI-   : x.xxxxx    x.xxxxx    x.xxxx
     PANTS
```
  
```
56 — MATERIAL   : xxxx····
```
58, (7)
FIG. 10C
```
50 — TITLE           : xxxxx····
52 — DATE            : xxx xx, xxxx    xx xx:xx~xx:xx
54 — PARTICIPANTS    : x.xxxx    x.xxxxx    x.xxxxx
60 — MATERIAL IN USE : xxxxxx
62 —     RECEIVED    : xxxxxx
64 —     TRANSMITTED : xxxxx
```
(7)

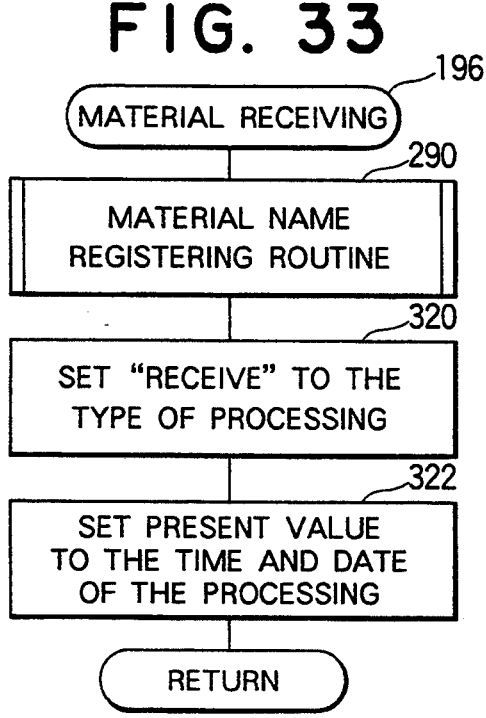
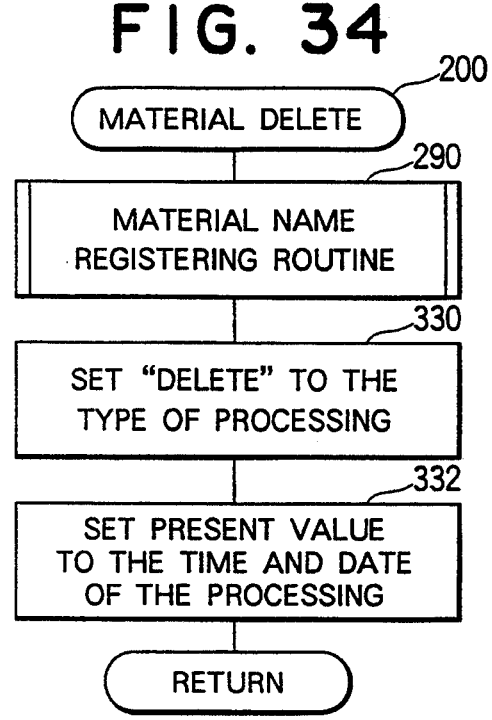
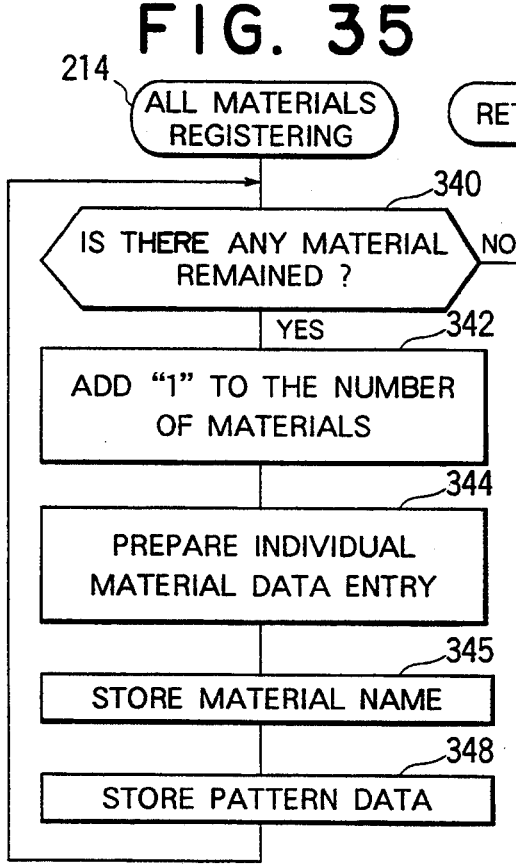
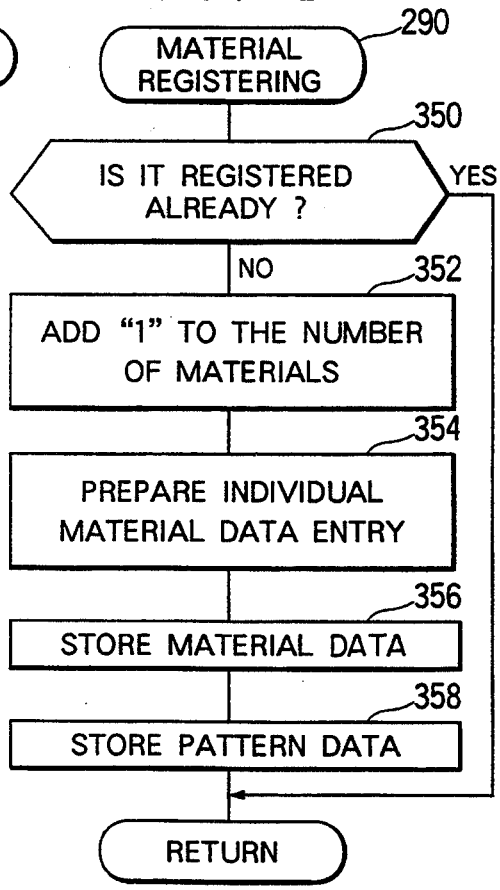

METHOD AND SYSTEM FOR STORING AND RETRIEVING COLLABORATIVELY PROCESSED INFORMATION BY ASSOCIATED IDENTIFICATION DATA

BACKGROUND OF THE INVENTION

The present invention relates to a method and system for storing and retrieving collaboratively processed information, and more particularly to a method of storing collaboratively processed information, in which information indicative of the matter or content of execution of a group work held by users is recorded automatically in a database at each execution of a collaborative information process preparatory to information retrieval in the future pertinent to the group work, to a method of retrieving materials pertinent to the group work, and to a system for carrying out these methods, the methods and system being intended for a computer-based remote conference system.

Among conventional collaborative information processing systems such as computer-aided remote conference systems, a system which automatically records the matter or content of a group work for each individual user has not been reported.

In regard to an electronic mail system which is one form of information processing systems of a file transfer type, several mail search methods have been proposed in the past.

For example, Japanese Patent Laid-Open JP-A-4-13836 describes a method of sorting mails on a tree, Japanese Patent Laid-Open JP-A-1-259451 describes a method of appending icons to mails for enhanced visualization, Japanese Patent Laid-Open JP-A-1-261723 describes a method of pictorial disclosure of the matter, and Japanese Patent Laid-Open JP-A-1-261775 describes a method of appending proper document names.

However, these prior art systems do not disclose techniques which are conceivably effective for the sorting of materials used in remote conference systems. Moreover, these prior art systems do not have effective suggestions on the application of the above-mentioned electronic mail search method to a conference system by which users exchange information on a real time basis and a collaborative information processing system which are the aims of the present invention.

Up to date, no one has unveiled a hint of distinguishing automatically the matters of diverse group works held in a remote conference system and recording automatically the matter of the works. In order to review the matter of a conference afterward based on the conventional scheme of information retrieval, it is necessary for each user to describe the matter of the conference or group work as a document intended for retrieval in the same manner as ordinary documents, and register the document, with a proper key word being affixed thereto, to a database.

SUMMARY OF THE INVENTION

An object of the present invention is to provide a method and system for storing collaboratively processed information capable of automatically storing information pertinent to a group work in a database without imposing an excessive burden on the user for the subsequent entry of ancillary data for information retrieval.

Another object of the present invention is to provide a method of storing collaboratively processed information, a method of information retrieval and a system for carrying out these methods, all intended to allow easy access to materials and data which have been referenced or created in a group work (conference), as well as the outline of the group work (conference) that has been held by utilization of a collaborative information processing system represented by a remote conference system.

In order to achieve the above objectives, according to one feature of the present invention, a conference system or collaborative information processing system including multiple terminal units (including computers and workstations) connected through communication lines comprises a database (history table) for storing information relating to a group work referenced or created by individual users, in which each terminal unit has a control program for controlling the execution of a group work and it runs the program at each event such as the commencement and completion of a group work, joining and disjoining of a user with the group work, or the like thereby to create information records indicative of the contents of these events, and register the information records in the form of a search table in the database.

The collaborative information processing system according to one feature of the present invention comprises a plurality of terminal units interconnected through a network, with each terminal unit being made up of a microprocessor incorporating a control program for controlling the execution of various application programs and the communication with other terminal units, input/output devices such as a display panel and keyboard, and preferably a telephone set, and the system is designed to enable individual users in remote places to make reference to a material which is displayed equally on a display screen of every terminal unit and participate in a conference and/or a group work for creating materials through the telephone set under control of the control program.

According to one aspect of the invention, a method of storing collaboratively processed information implemented by a computer network system including the above-mentioned terminal units comprises: a step of starting a group work by connecting control programs of multiple terminal units through logical communication paths, a step implemented by each control program, of generating identification data of the group work and work matter data pertinent to the situation of the work during a time band recognized to be midway of the group work, and a step of storing the work identification data and work matter data in association with each other in a database.

The group work identification data includes the name of the group work or conference, the date and time when the group work is held, and the names of participants of the group work, for example. This data may further include information for work identification specified arbitrarily by users. The work matter data includes the names of materials referenced in the group work, and preferably information indicative of when and how each material is treated, for example.

According to the present invention, information pertinent to a group work of users is stored automatically in the database of terminal units, and as a result, it becomes possible for each user to find afterward an intended material by searching the database for the records of the group work which has been held in the past.

The foregoing and other objects, advantages, the manner of operation, and novel features of the present invention will be understood from the following detailed description taken in conjunction with the accompanying drawings.

BRIEF DESCRIPTION OF THE DRAWINGS

FIGS. 8A–8D are diagrams used to explain the transition between the individual working state and the group working state in the conference system;

FIGS. 9A and 9B are diagrams used to explain the use of materials in the conference system;

FIGS. 10A–10C are diagrams used to explain the display of the search result based on the inventive work information;

FIG. 33 is a flowchart showing in detail the material reception routine 196 in FIG. 23;

FIG. 34 is a flowchart showing in detail the material deletion routine 200 in FIG. 23;

FIG. 35 is a flowchart showing in detail the entire material registration routine 214 in FIG. 23; and FIG. 36 is a flowchart showing in detail the material name registration routine 290 in FIG. 23.

DESCRIPTION OF THE PREFERRED EMBODIMENTS

Description will be made of a conference system having a function of storing and retrieving collaboratively processed information as an embodiment of the collaborative information processing system according to the present invention.

Figure 1:
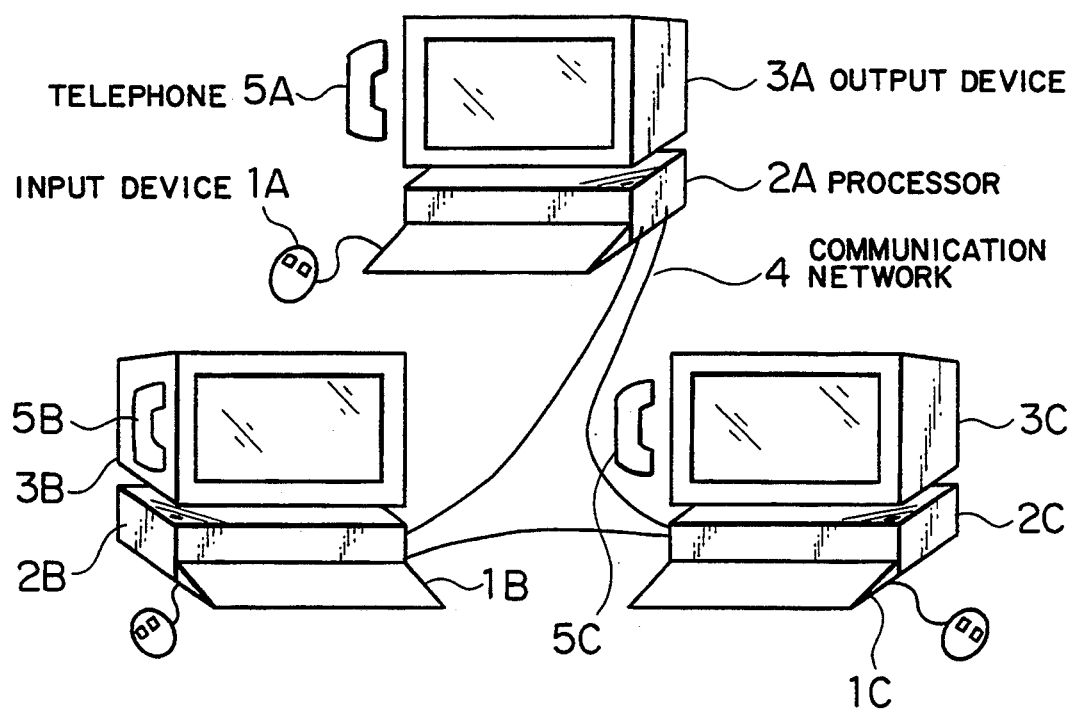
FIG. 1 is a diagram showing an external view of a conference system which is an embodiment of the collaborative information processing system according to the present invention.

FIG. 1 is an external view of the inventive conference system comprised of terminal units (or work stators) and telephone sets. The system includes input units 1 (1A, 1B, 1C), computational processing units 2 (2A, 2B, 2C) each incorporating a CPU and memory, output units 3 (3A, 3B, 3C) which are display units for displaying the result of process, a communication network 4 which supports data communication among the processing units, and telephone sets 5 (5A, 5B, 5C) which support voice communication among the conference participants. The unit sections 1, 2 and 3 will be called "workstations" in this embodiment.

The input unit 1 may employ a joy stick, tablet or the like. Such pointing devices as a mouse and joy stick are useful means for specifying a position on a display screen of the display unit 3 or selecting an item in the displayed menu for the branching of action. The output unit 3 may employ an audio output device for handling multi-media information.

For the communication network 4, use of the ISDN (Integrated Services Digital Network) enables the processing unit 2 to have general control of the communication network inclusive of the telephone set 5, and it is advantageous for the management of the facility and fee. It is apparently possible to organize the system by taking separate contracts for a data communication network which links the processing units 2 and a telephone network which links the telephone sets. In this case, the processing unit 2 can operate the telephone set 5 to some extent through the use of the RS-232C interface, for example.

In this conference system according to the invention, individual users of the workstations (computer systems) interconnected through the communication network operate their input units 1 and receive visual and acoustic information for their output units 3, as well as exchanging voiced information through the telephone sets 5, thereby to make decisions in the conference or group work or create materials. Information displayed on the output unit is treated with the processing unit thereby to carry out the information processing activity which cannot be accomplished by the speech-based system.

The basic arrangement of this sort of remote conference system is described in detail in U.S. patent application Ser. No. 07/350,850 filed May 12, 1989, now abandoned, based on Japanese Patent Application No. 63-114636 filed May 13, 1988 and U.S. patent application Ser. No. 07/614,087 filed Nov. 15, 1990, now U.S. Pat. No. 5,208,912, based on Japanese Patent Application No. 01-294983 filed Nov. 15, 1989 by the inventors of the present invention, the contents of which are incorporated herein by reference.

Although FIG. 1 only shows a conference held by three users each using a workstation, the inventive conference system supports a conference for four or more participants, and even a conference for one participant is logically possible. The following explains the functions of conference system by taking an example of a three-person conference which comprehends the above-mentioned generality.

Figure 2:
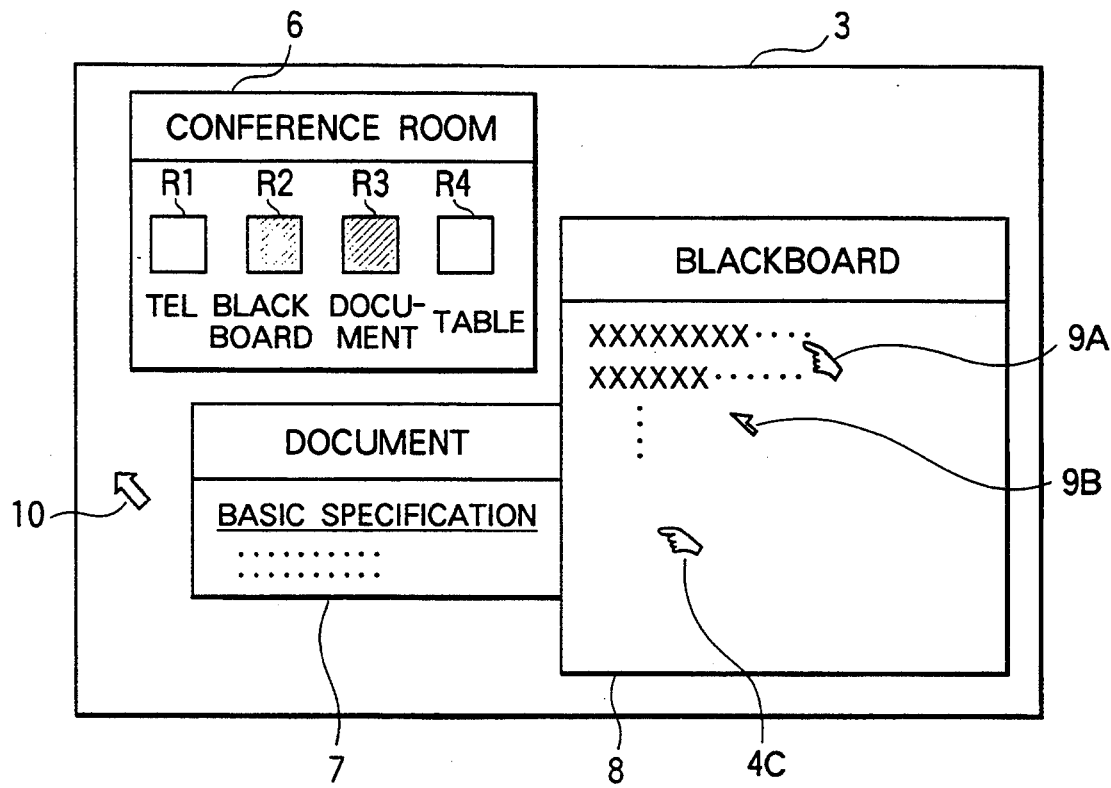
FIG. 2 is a diagram used to explain the typical affair of conference in which information is stored and retrieved according to the present invention.

FIG. 2 shows a typical affair of conference displayed on the output unit 3. Indicated by 6 is a conference room window and it can be said to be a cross section of conference viewed by the participants. Workstations which constitute the conference system have a range of support from a work of one person to a work done by many participants. For a three-person conference, the conference room window of each person (workstation) is set to the same conference. Placed in the conference room window 6 are icons R1–R4 which represent materials of conference and such facilities as a blackboard in the form of relatively small symbolic images. Although the conference room window includes other icons such as a personal memo and telephone set in addition to the above-mentioned resources, they are not shown in FIG. 2. An icon is selected by a cursor 10 which has its position on the screen controlled by means of a mouse that is a pointing device, so that the information processing or control operation by use of the resource corresponding to the selected icon is carried out.

In the example of FIG. 2, a document which is a conference material (icon R3) is displayed in a document window 7, and a blackboard which is a conference facility (icon R2) is displayed in a blackboard window 8.

When a participant of one workstation takes an operator action to bring a resource in the conference window 6 to an other window 7 or 8, the conference control program which will be explained later functions to cause the output units 3 of remaining participants to have the same change of screen (display of the document window 7 and blackboard window 8) in response to the operator action.

The conference control program propagates the action taken by any participant in the document window or blackboard window to workstations of other participants so that a consistent change appears in all pertinent windows on the screen 3. Accordingly, when one of participants moves the cursor in a window, the same cursor movement takes place in other workstations, and all participants can argue on the matter or content of material or edit data by pointing the same position on their screens.

In FIG. 2, indicated by 9 in the blackboard window 8 are pointing objects (POs) which are used by the participants to point the same position in the window. In this embodiment, three participants have assignments of POs 9A–9C of different shapes or different colors. For the identification of PO, the self PO is orange invariably, or the name or initial of a participant is affixed to one's PO, for example.

Figure 3:
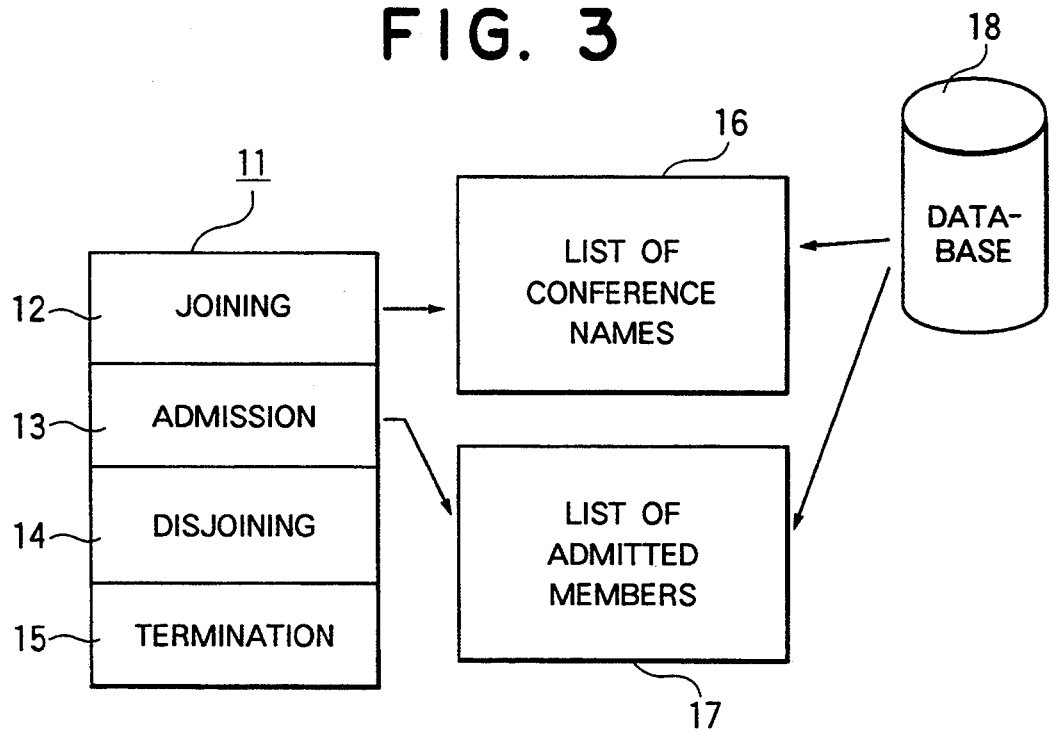
FIG. 3 is a diagram showing an example of the menu of control commands.

FIG. 3 shows an example of the menu 11 of conference execution commands which are used to start the conference or alter the attribute of conference (e.g., the number of participants). In this embodiment, the conference execution commands are "join" 12, "admit" 13, "disjoin" 14 and "end" 15.

When the "join" command 12 is selected, a list of conference 16 is displayed for the next menu. An operator selects the name of a conference which he or she intends to join, and the preparatory operation for the participation to the conference starts. With the "join" command or a conference name being selected, each user enters the personal data (name and/or identification number) in response to the prompt made by the control program. The personal data is used as the participant name data which is an item of collaboratively processed information as will be explained later, and also used for verifying the personal legitimacy of the access to the conference system. The personal data may be substituted by a record on a magnetic card or IC card which is verified at the start-up of the workstation or in response to the request by the control program.

When the "admit" command 13 is selected, a list of admitted participants 17 is displayed as a menu on the screen, and when some one in the list is selected with the cursor (or when some one who is not registered in the list is added), the workstation of that person is newly included in the conference (conference system) which is already active. Accordingly, a person who has received the introduction to a conference through the telephone or the like and expressed the will of participation to the conference by selecting the "join" command 12 on the workstation can join in the conference when a participant of a workstation which is already included in the conference system enters the "admit" command 13, and by taking this procedure the number of conference participants can be increased.

The conference name list 16 and admitted participant list 17 are produced from information in a conference database 18 which stores various data related to conferences. The search table (group work database) of collaboratively processed information created according to the invention is recorded in part of a memory (file) in which the database 18 is formed.

Any participant can pull out of the conference at a midway point by selecting the "disjoin" command 14. This results in a scale-down of the conference (reduction in the number of conference participants). When one of participants selects the "end" command 15, the conference is terminated. As a result of entry of the "disjoin" command 14 or "end" command 15, the workstation which pulls out of the conference has its conference window turned to the field of individual work.

Figure 4:
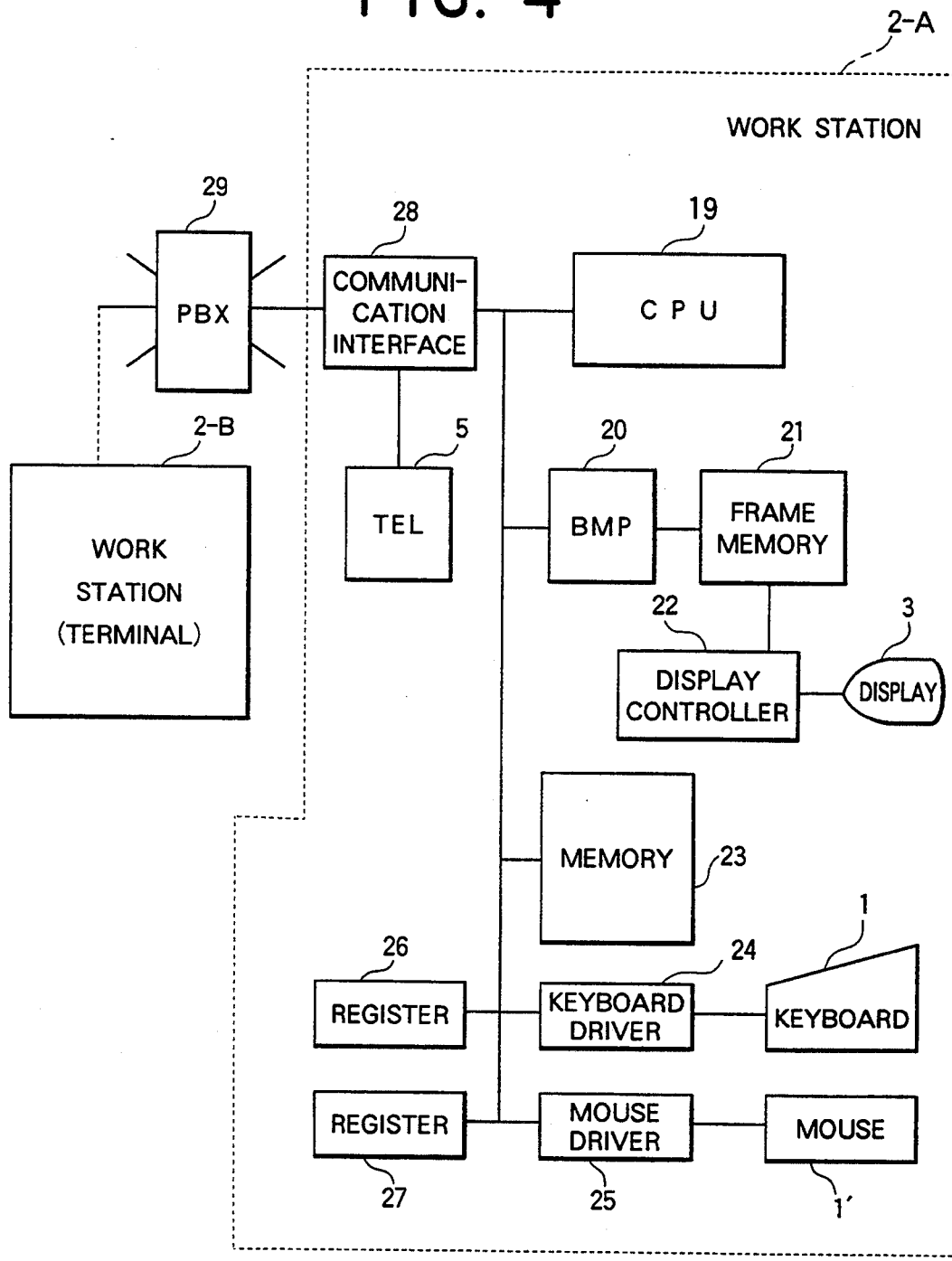
FIG. 4 is a block diagram showing, as an example, the structure of terminal units (workstations) which form a conference system.

FIG. 4 is a block diagram showing the basic arrangement of the workstation 2. Indicated by 23 is a memory unit for storing various kinds of programs and data, and 19 is a central processing unit (CPU) which executes the data processing in accordance with a program read out of the memory unit 23. The CPU 19 issues commands to a bit map processor (BMP) 20, which then controls display on the output unit 3. Specifically, the BMP 20 responds to a command from the CPU 19 to rewrite a frame memory 21 which stores the content of display as image data. A numeral 22 denotes a display controller which transfers the contents of the frame memory 21 to the output unit 3. A numeral 24 denotes a keyboard driver for transferring character codes entered through the keyboard, which is one of the input unit 1, into a register 26, and 25 is a mouse driver for transferring data entered through the mouse, which is one of the input unit 1, into a register 27. In the present invention, certain events occurring during the execution of a collaborative information processing are memorized, with the date and time being affixed thereto, and the date and time of event are provided by the timer function which is a basic function of the CPU 19.

This embodiment employs, as the communication system among workstations and telephone sets, the PBX (Private Branch Exchange) 29 which provides the ISDN interference that enables voice and data communication over a single line. Each workstation represented by the CPU 19 and each telephone set are connected to the PBX 29 through the communication interference unit 28, and it has mutual communication with counterpart devices by way of the PBX 29. It is also possible to link only telephone sets to the exchange, with workstations being interconnected separately through other networks such as the LAN (Local Area Network) or backet exchange, as mentioned previously.

Figure 5:
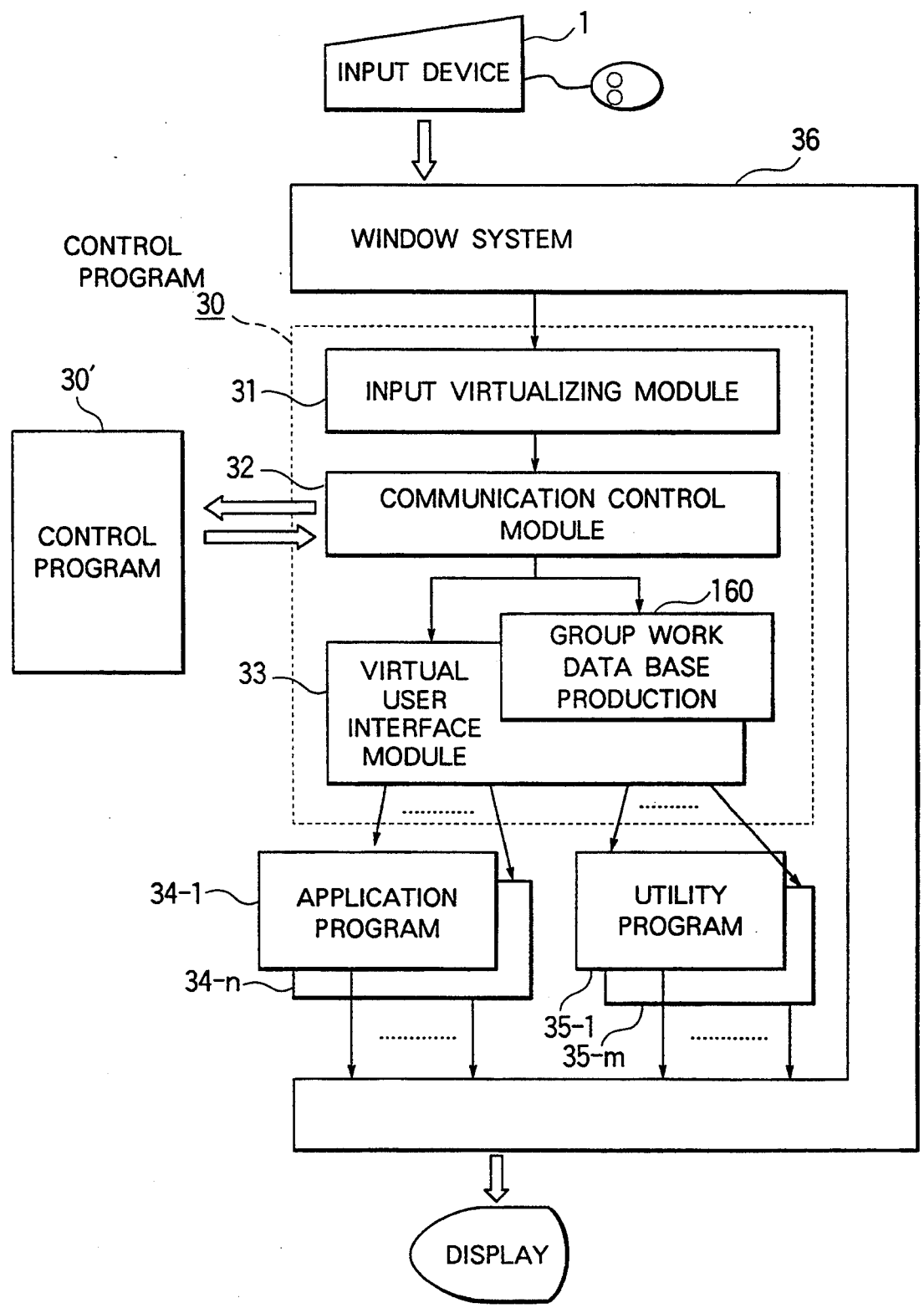
FIG. 5 is a diagram showing, as an example, a software configuration in each terminal unit.

FIG. 5 shows the basic organization of software established in each workstation 2 for accomplishing the conference system. In each workstation, various kinds of programs executed by the CPU 19 and interface functions for the input unit 1 and output unit 3 are provided by a window system 36. A program receives a data, which is entered on the input unit 1, through the window system 36, and transfers a display command to the window system so that the result of execution of data processing is displayed on the output unit 3.

Indicated by 30 is a conference control program for forming the field of a conference in a workstation 2. Conference control programs 30 (30′) placed in multiple workstations in network linkage are connected through logical communication paths, so that a command entered on any one workstation is transferred to other workstations by use of the function of the conference control programs, thereby forming a field of conference by which the same data processing result can be referenced on these workstations.

Data visualized for the conference participants is produced and displayed by interaction programs (application programs) 34 and utility programs 35. The interaction programs 34 include a document editing program, table editing program and blackboard program, for example. In multiple workstations, the same interaction programs 34 are run in unison under control of their conference control programs 30, whereby all participants can view the same display.

The utility programs 35 are intended to enhance the easiness of use of the interaction programs 34 for group works, and the programs 35 include a PO control program for displaying a PO (Pointing Object) in the window used by a interaction program 34, for example. Using the PO control program, even in the case of including an existing application program as one of interaction programs 34, enables all workstations to display their POs which point the same position in the window where the application program is operating.

The conference control program 30 is made up of an input virtualizing module 31, a communication control module 32, and a virtual user interference module 33.

According to the invention, input data or input con, hand (will be termed generically "input data") which has been entered by a participant on the input unit 1 is received by the input virtualizing module 31 through the window system 36, and it is converted to the specified data format (virtual input data), with a header including such information as participant identifier being affixed thereto, used in the conference system. The virtual input data produced by the input virtualizing module 31 is transferred to the communication control module 32.

One of the roles of the communication control module 32 is to have communication with other conference control programs 30 thereby to propagate input data created by one workstation to the interaction program 34 which is under control of the other conference control program 30 or to the utility program 35. Another role of the conference control program 32 is to transfer virtual input data entered on the input unit 1 and received from other workstation to the interaction program 34 and utility program 35 under control of the conference control program 30 of the self workstation through the virtual user interference module 33, and to transfer the virtual input data to a group work database producing program 160 which will be explained later.

The virtual user interference module 33 supplies the received virtual input data to an appropriate interaction program 34 or utility program 35 without altering the format or by converting the data back to the original input data format.

The interaction program 34 and utility program 35 implement data processing for the input data which has been received through the above-mentioned procedure, and deliver the result of process to the output unit 3 by way of the window system 36. It is possible for a conference control program 30 to have more than one interaction program 34 and utility program 35. For example, multiple functions such as document editing and table calculation, or PO display and hand-written curve display can be used concurrently in one conference.

Figure 6:
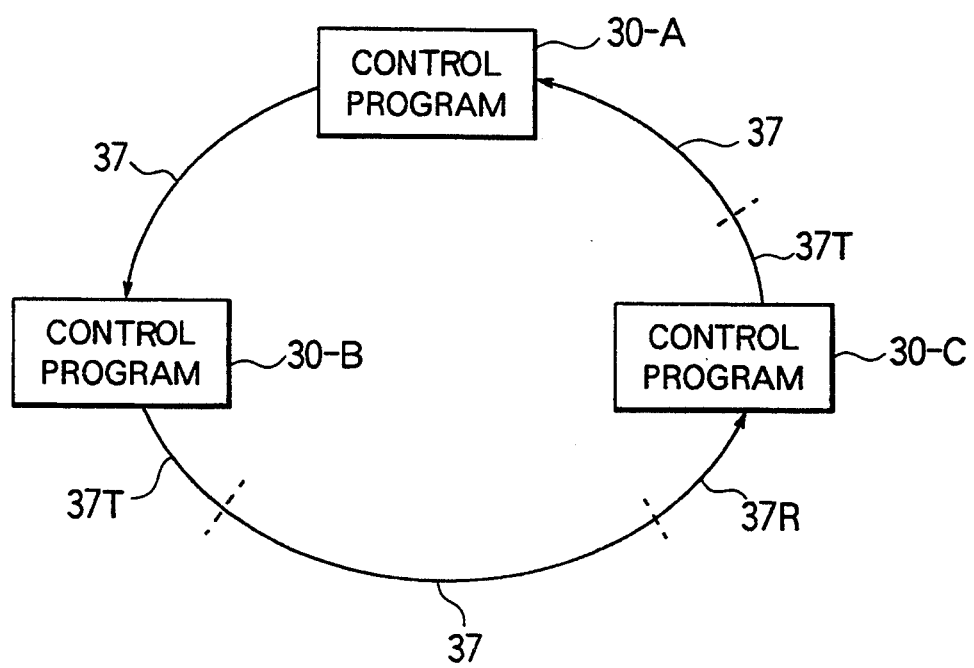
FIG. 6 is a diagram used to explain the linkage among control programs when a conference system is formed by multiple terminal units.

Next, the method of forming logical communication paths 37 among three conference control program 30-A, 30-B and 30-C will be explained with reference to FIG. 6. Such devices as the input unit 1 and output unit 3 are not shown in the figure for the simplicity of explanation.

The conference control programs 30 which constitute a conference system have two logical communication paths 37 (37R, 37T) each. One path 37T is a sending path for transmitting the virtual input data to other conference control program 30, and another path 37R is a receiving path for receiving the virtual input data from other conference control program 30. By connecting the sending path of one program 30 to the receiving path of another program 30, all conference control programs 30 can be linked through a ring logical communication path. Input data entered on the input unit 1 of one workstation is propagated to all conference control programs 30 along the ring logical communication path 37.

FIGS. 7A–7E show the procedure of operating a conference system by linking these conference control programs 30 (30-A, 30-B, 30-C) through the logical communication paths 37. Users who operate these workstations are represented by A, B and C.

Figure 7A:
FIGS. 7A–7E are diagrams explaining a method of altering the control program linkage at the start and termination of a conference and changes in the action of conference.

FIG. 7A shows the system status after the users A, B and C have displayed the conference room window 6 on their workstations. At this stage, all control programs 30-A, 30-B and 30-C are running independently.

Figure 7B:
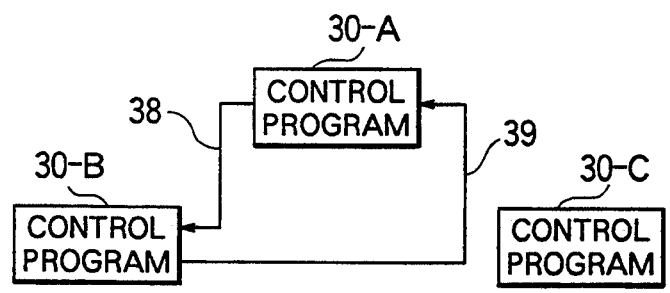

FIG. 7B shows that the user A selects the "admit" command 13 in the conference execution command menu 11 to admit the user B to join in the conference and the user B selects the "join" command 12 in the conference execution command menu 11 to request the participation to the conference, and that the field of conference for the participants A and B is formed. A logical communication path 38 is established from the conference control program 30-A to 30-B and another logical communication path 38 is established in the opposite direction.

Figure 7C:
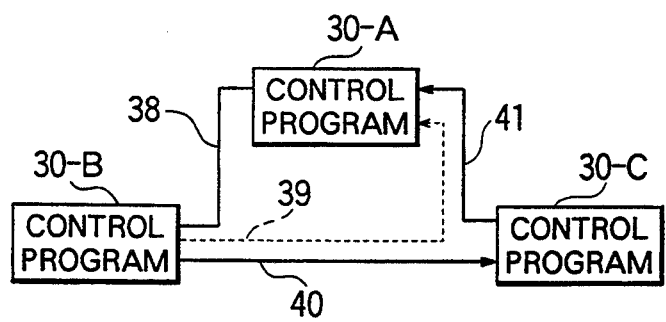

FIG. 7C shows that the user A selects the "admit" command 13 in the conference execution command menu 11 to admit the user C to join in the conference and the user C selects the "join" command 12 in the conference execution command menu 11 to request the participation to the conference, and that the field of conference for the participants A, B and C is formed. In this case, the logical communication path 39 from the control program 30-B to 30-A is disconnected, and a logical communication paths 40 and 41 are established from control program 30-B to 30-C and from 30-C to 30-A, respectively.

Figure 7D:
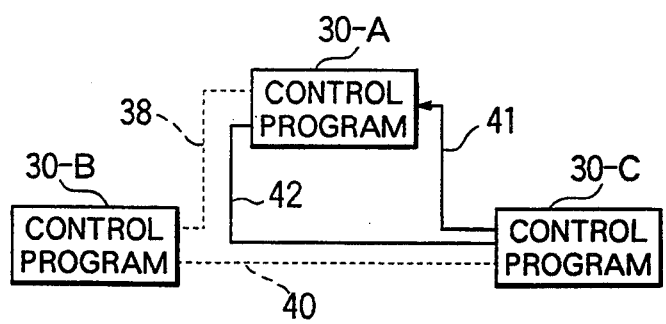

FIG. 7D shows that the user B selects the "disjoin" command 14 in the conference execution command menu 11 to pull out of the conference, and that the conference is scaled down to include only two participants A and C. In this case, the logical communication paths 38 and 40 from the control program 30-A to 30-B and from 30-B to 30-C, respectively, are disconnected, and a logical communication path 42 is established from the control program 30-A to 30-C.

Figure 7E:
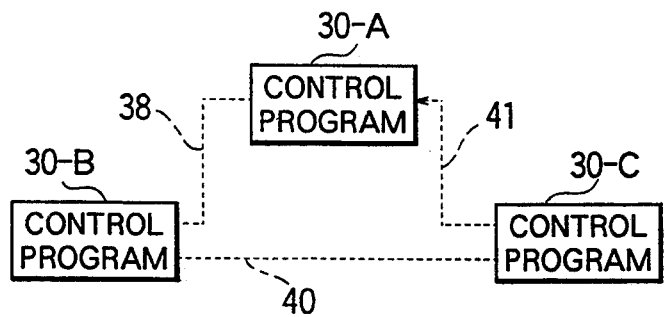

FIG. 7E shows that the user A selects the "end" command 15 in the conference execution command menu 11 to terminate the conference. All logical communication paths are disconnected in response to the entry of the "end" command.

FIGS. 8A–8D show displays on the screen in various states in the progress of a group work. This example is a conference using a material 44 labeled "material" and held by users A and B through the conference window 6 labeled "conference".

FIG. 8A shows the state after the users A and B have opened the conference windows 6-A and 6-B on their workstations. At this time, no logical communication path is yet established between the conference control programs, and these workstations are placed in the individual working environment. Accordingly, each workstation can deal with an individual work in the conference window independently. Indicated by 43-A and 43-B are a field of title affixed to the windows 6-A and 6-B, and they display "(waiting)", indicating that the group work is not yet started. Although materials 44-A and 44-B are placed in the windows from the beginning, they may be introduced from a common database or the like by individual workstations or one material may be transferred from one workstation to another after the conference windows have been opened.

FIG. 8B shows the establishment of a conference by connection of the conference windows 6-A and 6-B through logical communication paths. The workstation have their title fields 43-A and 43-B displaying "(executing)" indicative of the group working status. Instead of the literal display of the conference executable state, the background color of the title field or the whole conference window may be changed.

FIG. 8C shows, as a block diagram of program, the conference field. The conference windows 6-A and 6-B are displayed on the screens by the respective control programs 30-A and 30-B, which are connected by the logical communication paths 37 as mentioned above.

FIG. 8D shows the state after the conference field has been closed and the workstations has resumed individual works. In this state, the title field displays "(waiting)" again. The materials 44-A and 44-B were used in the conference and they were partially modified during the conference in general. Commencement and termination of a conference (group work) take place in correspondence to the establishment and disconnection of the logical communication paths 37, and are identified by conference control program 30.

FIGS. 9A and 9B show, as views taken from one user, the affair of materials used in the group work.

FIG. 9A shows display of the conference window 6 including an icon 44 which represents a material. When one user operates the mouse to point the icon 44, the material corresponding to the icon 44 is opened on the screens of both users.

FIG. 9B shows the state after the material icon 44 has been activated and its content is displayed in the document window 7. At this time, the material icon 44 in the conference window 6 has its appearance, e.g., color, changed from the state of FIG. 9A so that the users are notified of the use of the material. Addition of a new window in response to the specification of material is carried out by the conference control program, and the beginning and ending of use of each material are recognized by the conference control program 30.

FIGS. 10A–10C show examples of display of the result of information retrieval pertinent to conferences or group works which have been held by the conference system in the past. The result of information retrieval is displayed in the document window 7 in this embodiment.

FIG. 10A shows an example of basic data of the work information. The data include "name" 50 which is the name given to the group work, "date and time" 52 indicative of the year, month, day and time when the group work was held, "participants" 54 which are the names of participants of the group work, and "materials" 56 which are the names of materials referenced by the participants during the group work.

The "name" 50 is determined arbitrarily by the users to reflect the work. For example, similar meetings may be named "meeting on specifications" invariably, or one of them may be named "fifth meeting on specifications". The work information shown in this embodiment are only examples of basic data, and these items may be added by "record of conference", "items of decision", etc. It is convenient when each user is allowed to define information which well reflects the matter of work, such as "relation with other conference", "comment", etc.

FIG. 10B shows an example of display of the pictorial information 58 in addition to a literal display of the conference participant names. The information 58 includes such static images as photographs and portraits and video images. The use of the pictorial information 58 enables the user to search for a person whose name is forgotten.

FIG. 10C shows an example of display of the classified materials used in the group work. In the figure, "materials in use" 60 are materials which were actually referenced by the operator during the work, "received materials" 62 are materials received by the operator from other participants during the work, and "transmitted materials" 64 are materials sent by the operator to other participants during the work. This display enables the user to search for a "material which was received at that time" based on a faint memory.

Next, an example of operation for searching group work information will be explained.

Figure 11:
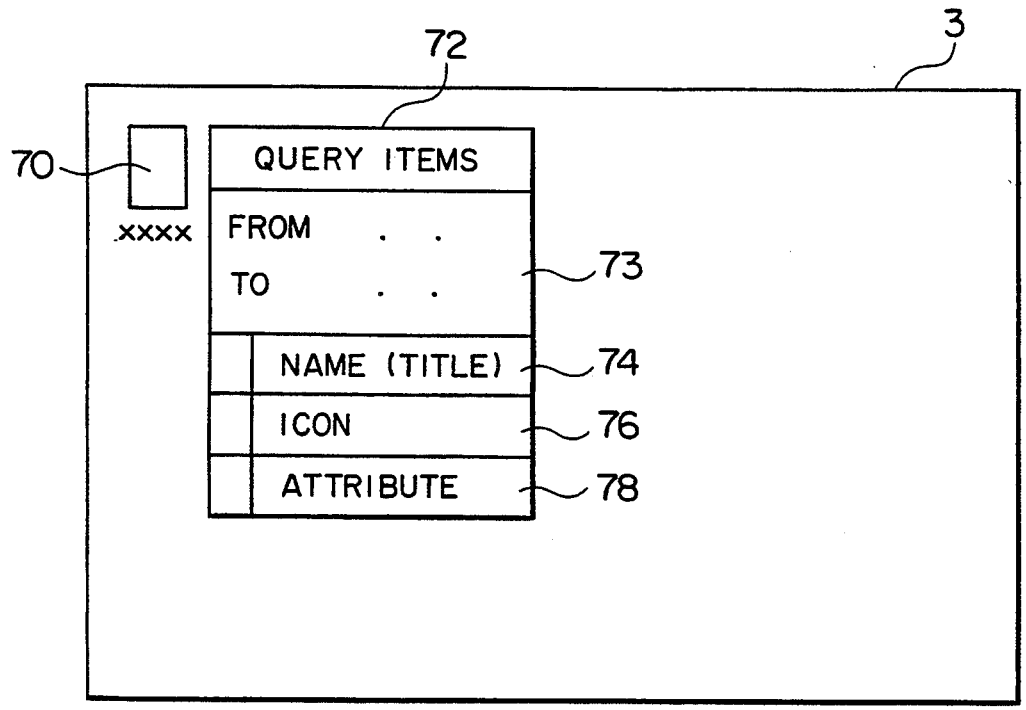
FIG. 11 is a diagram showing an example of a display screen for requesting the work information search.

FIG. 11 shows an example of display on the display unit 3 when a user requests a work information search.

The display screen of the workstation displays the icon 70 with label "search" to be selected by the user for starting the information retrieval. Although in this embodiment the search icon 70 is placed alone in the display for the simplicity of explanation, it is only one of icons for selecting various functions in practical applications.

When the user operates the mouse to select the search icon 70, a menu of query items 72 used by the user for specifying a search condition and the like appears on the screen. Although in this example "date and time" 73 is only search condition to be specified, other conditions such as "name of work" and "number of participants" for example may be included.

Character strings 74, 76 and 78 are items of selection of the display mode for the search result. The user operates the mouse to move the cursor to the intended character string and depress one of the buttons on the mouse thereby to select the mode. An alternative manner of selection is to attach numbers to the items 74, 76 and 78 and allow the user to enter the number of the intended item on the keyboard 1. The following explanation assumes the operator's setting for the "date for search" to be Oct. 10, 1990.

Figure 12:
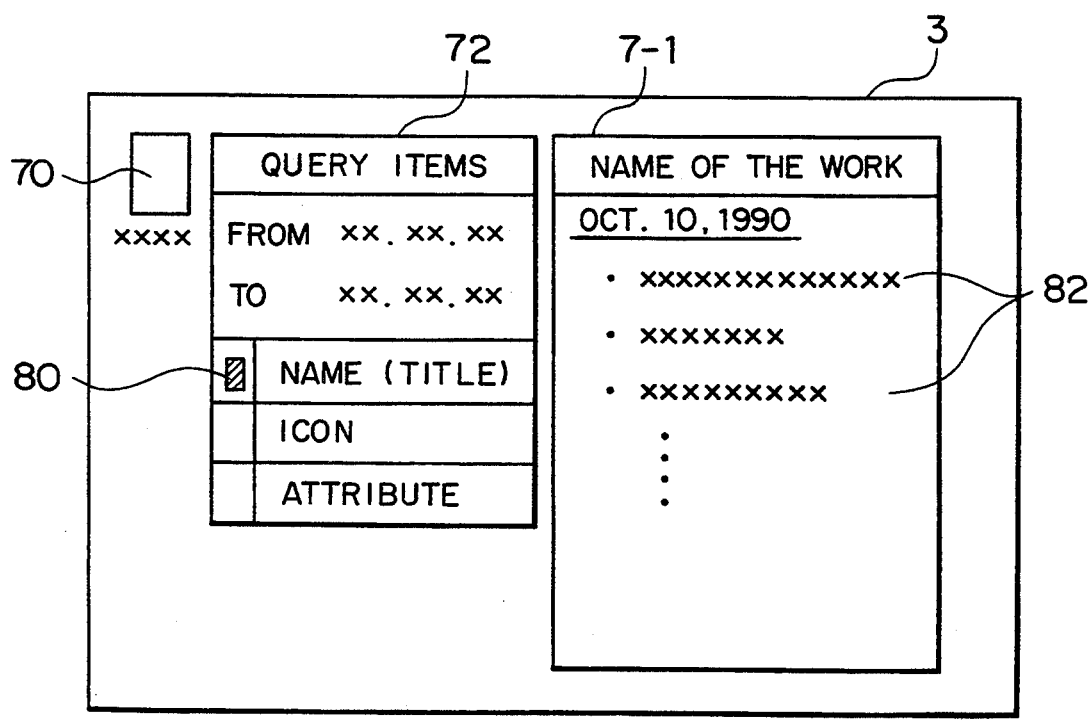
FIG. 12 is a diagram showing an example of a display screen for names of work information.

FIG. 12 shows an-example of display of the case when the user has selected "name" 74 as a display mode for the result of work information search. Indicated by 80 is the selection mark which appears in response to the selection of the display mode. In this case, the search result is displayed only in the field of "name of work" 82 in the document window 7-1. This display mode is useful for examining multiple group works at once.

Figure 13:
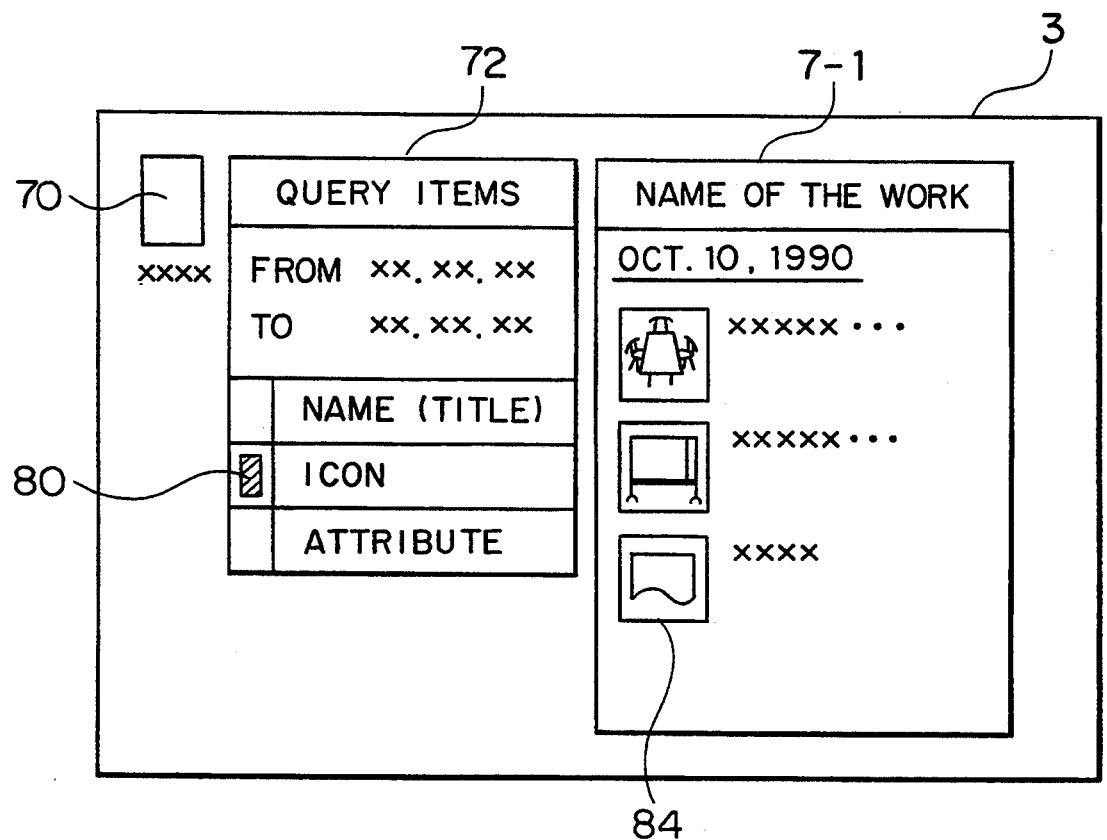
FIG. 13 is a diagram showing an example of a display screen for icons of work information.

FIG. 13 shows an example of display when the user has selected "icon" 76 as a display mode. The selection mark 80 is placed at the selected item. In this mode, the search result is displayed with work names and icons 84 which signify features of works. This display mode enables the user to find the intended work intuitively by viewing icons which represent the categories of works.

Figure 14:
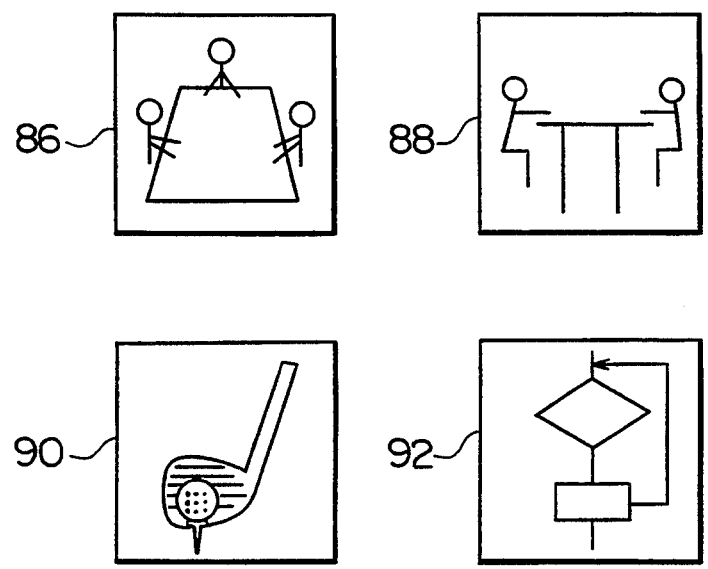
FIG. 14 is a diagram showing an example of icons which denote works.

FIG. 14 shows typical examples of the work icons 84. For example, an icon 86 signifies a group work held by three or more participants. Icons may be created to reflect the matter of works, instead of expressing the categories of works. Shown by 90 is the icon of a meeting of a golf club, and 92 is the icon of a meeting for the study of algorithm.

Figure 15:
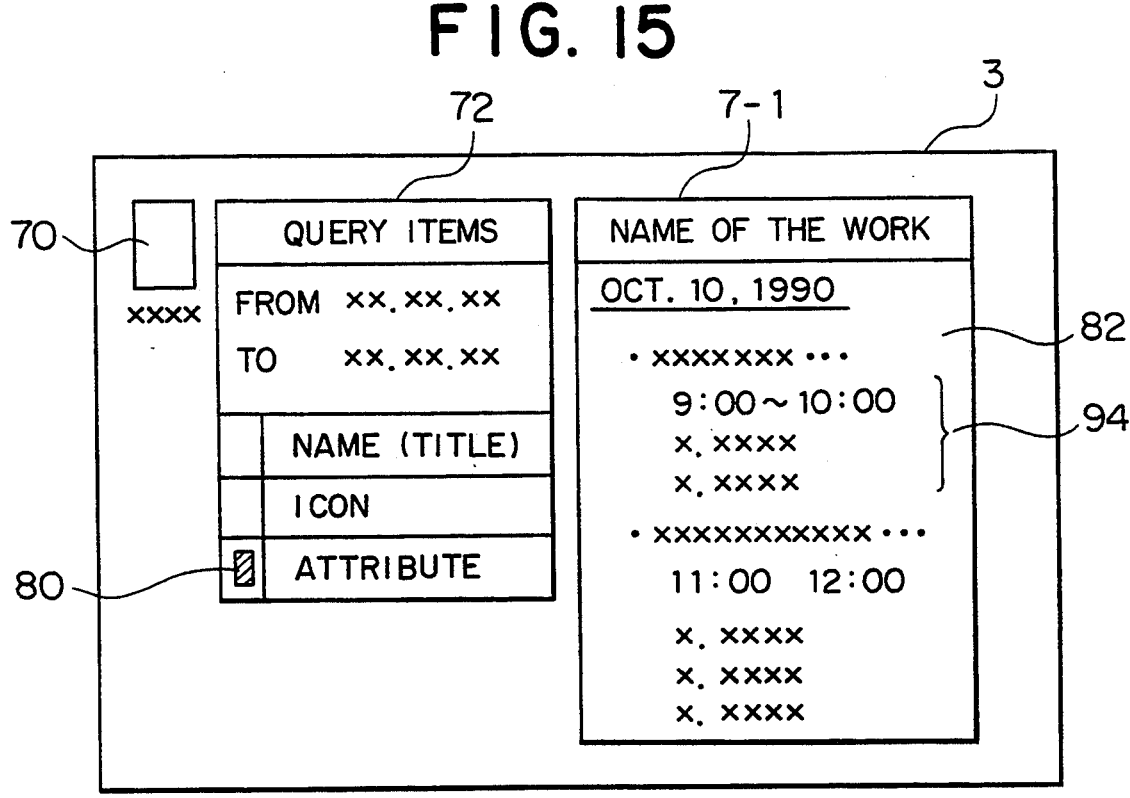
FIG. 15 is a diagram showing an example of a display screen for work information having attributes.

FIG. 15 shows an example of display when the user has selected "attribute" 78 as a display mode. The selection mark 80 is placed at the selected item. In this mode, the search result is displayed with "name of work" 82 accompanied by "attribute of work" 94 such as the date and time and the names of participants of the work in the document window 7-1. This display mode enables the user to know the details of searched works to some extent, and it is suited to find an intended work directly.

Figure 16:
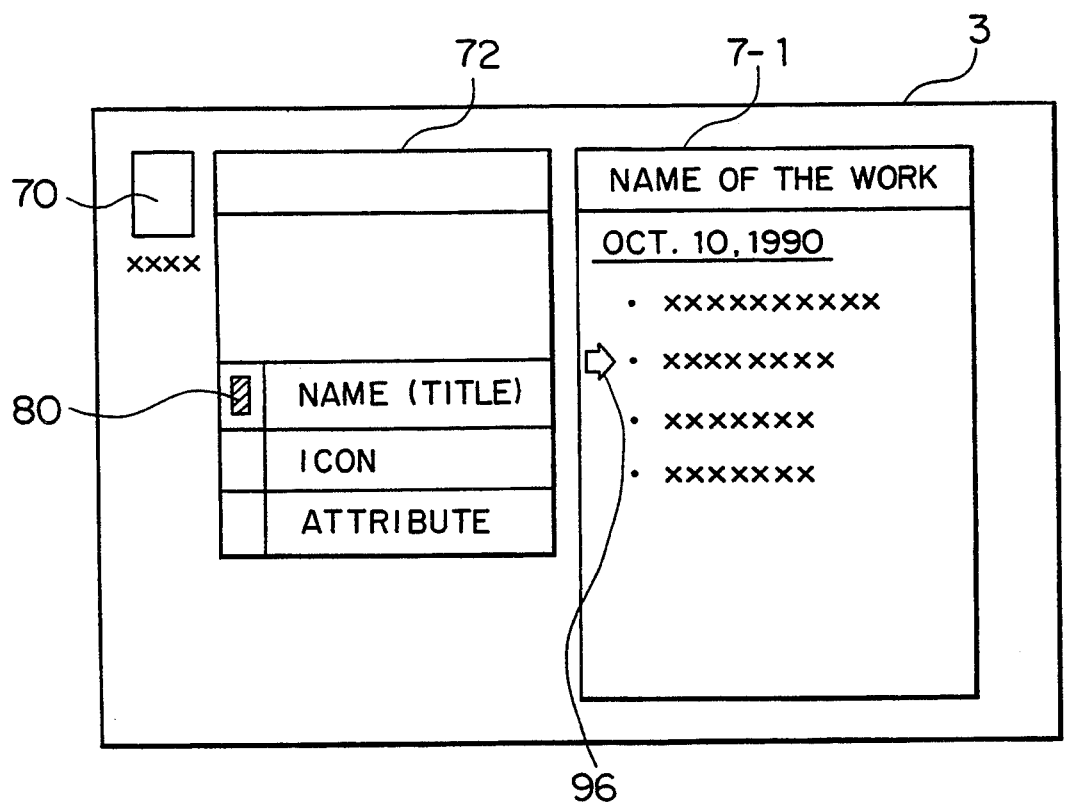
FIG. 16 is a diagram showing an example of a display screen for requesting detailed information pertinent to a specific work.

FIG. 16 shows an example of display used to request more detailed information on the search result which has been obtained based on the search condition specified on the search menu 72. In this example, the user has specified "name" 74 and, based on the list of work names displayed in the document window 7-1, the user further specifies the name of a work on which detailed information is needed. For the first selection of "icon" 76 or "attribute" 78, detailed information can be acquired in the same manner. The name of the work for which detailed information is to be retrieved is pointed by a mark 96. The manner of specification is identical to the selection of an item in the search menu 72. In the example of FIG. 16, "meeting on specifications" is selected for requesting detailed information.

Figure 17:
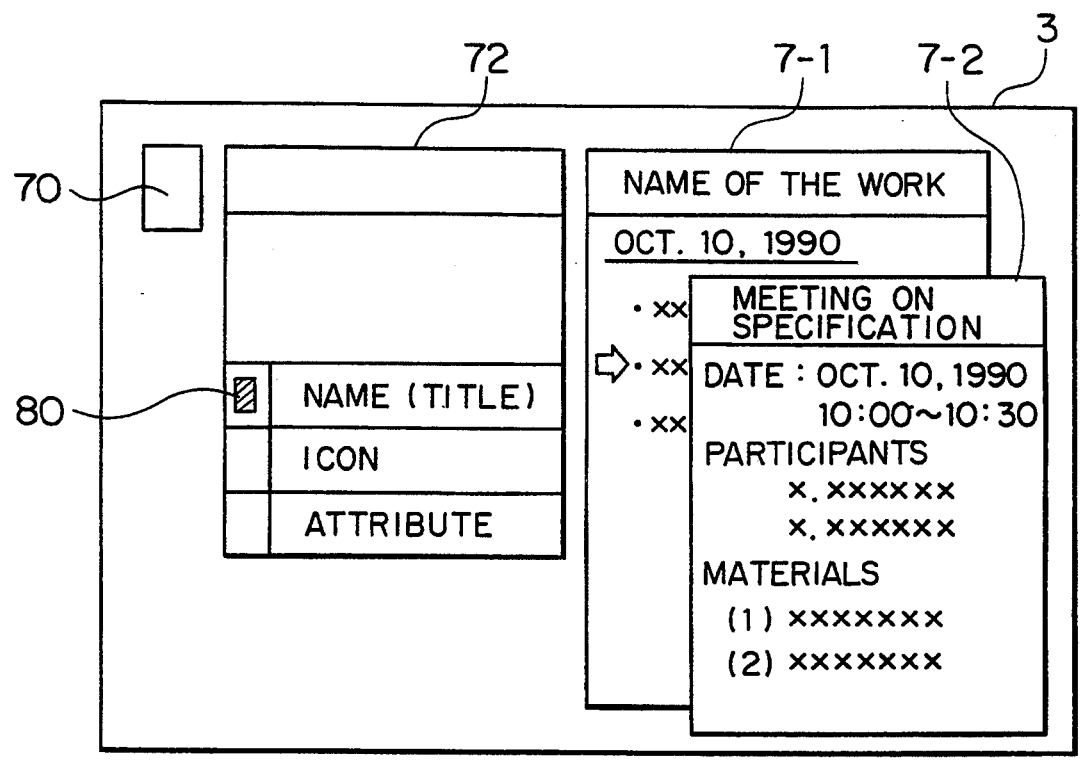
FIG. 17 is a diagram showing an example of a display screen for detailed information of a specific work.

FIG. 17 shows an example of display of the detailed information which has been requested for the work. The information is displayed in another document window 7-2. This example includes "date and time", "names of participants" and "names of materials", and more detailed information may be included.

Figure 18:
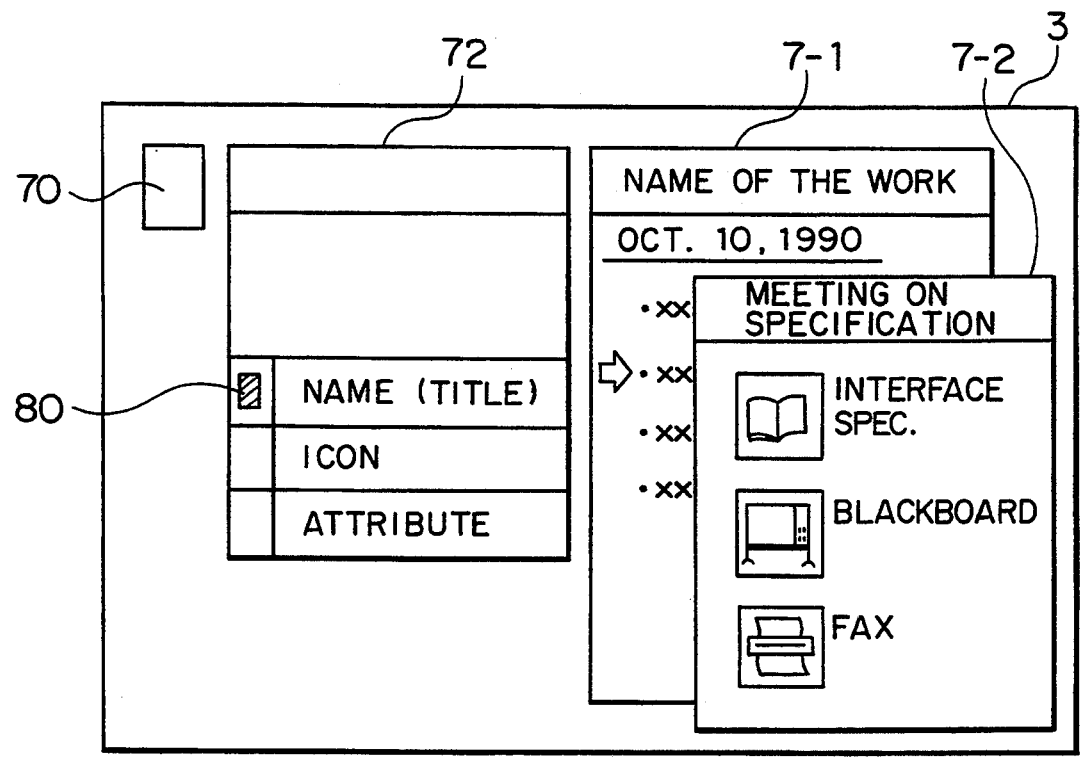
FIG. 18 is a diagram showing an example of a display screen for a working environment pertinent to a specified work.

FIG. 18 shows another example of display of detailed information. In this example, the content of the conference room window 6 for the specified work at the time of execution by the conference system is revived on the screen, and it reveals that a telephone set, facsimile unit and blackboard were set in the conference window 6 for the work. This embodiment is useful for finding or reminding an intended work or a material used in the work based on information which is laid out attractively.

Figure 19A:
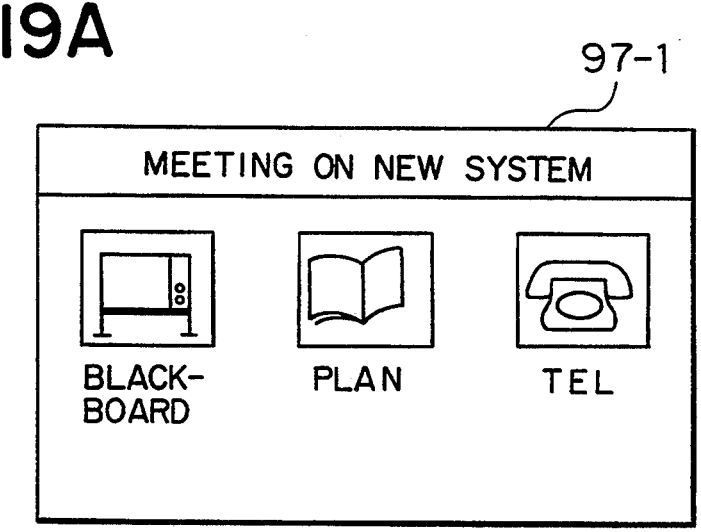
FIGS. 19A and 19B are diagrams showing, as an example, works and corresponding fields of group work.
Figure 19B:
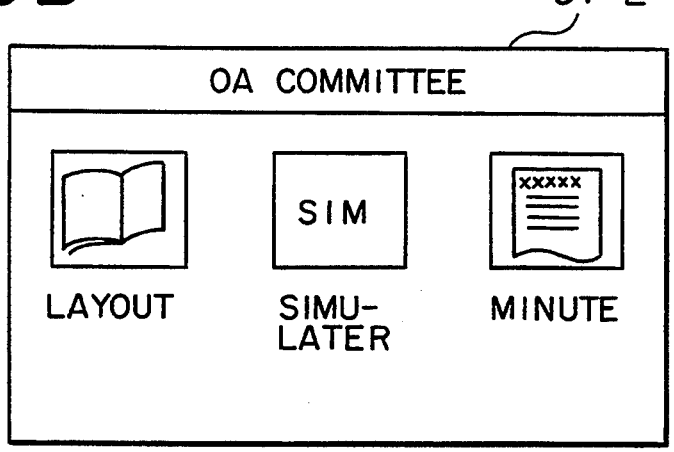

FIGS. 19A and 19B show other examples of the conference window 6. The conference window 6 can be labeled arbitrarily, and the user can bring in a variety of facilities. Preparations of different environments which meet the demands of various kinds of work are apparently convenient. For example, provision of two conference windows 97-1 and 97-2 shown in these figures, even although they are similar, has the following advantages.

In the embodiments of the invention, the title affixed to the conference window 6 is used for the name of a group work which is recorded for the future retrieval. This allows the user to be free from making a work name at each event. However, as the number of same work names increases, it will be inconvenient for the future retrieval, and on this account it is desirable to use conference windows of different names for conferences or group works of different categories. By merely making this separation at the beginning of each work, the search job is eased significantly.

Information retrieval described above is accomplished based on various tables in the group work database 18 in which information pertinent to conferences and group works held in the past are recorded. The following explains the structure of these tables and the method of creating the tables.

Figure 20:
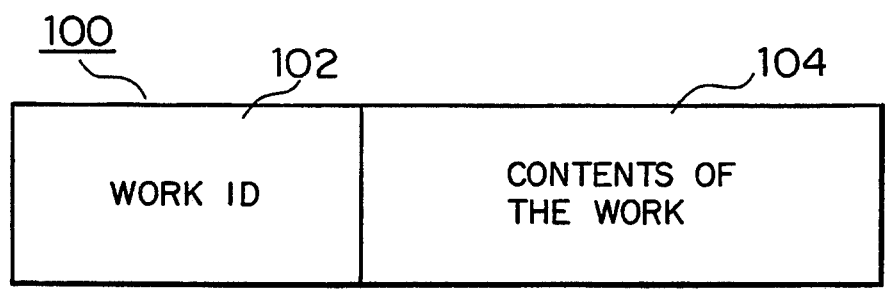
FIG. 20 is a diagram showing a format of the work information table which is stored in the database of each terminal unit.

FIG. 20 shows the basic arrangement of a table 100 for recording the group work information. The table 100 has a work identification data field 102 and a work matter field 104. The work identification data field 102 is a record of information for separating individual group works, and the work matter field 104 is a record of information specific to each group work.

Figure 21:
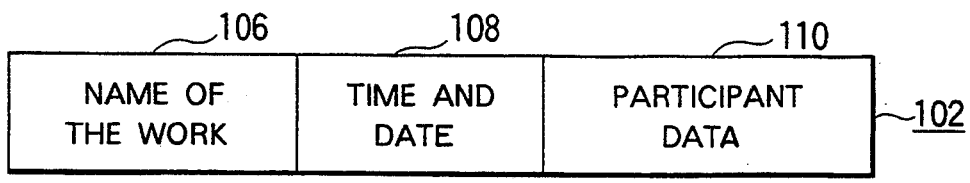
FIGS. 21A–21E are diagrams used to explain the format of the work identification data table.
Figure 21:
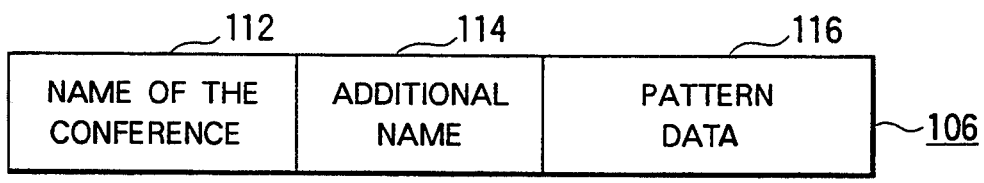
Figure 21:
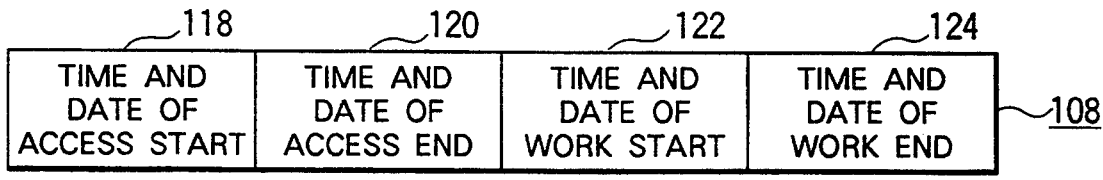
Figure 21:
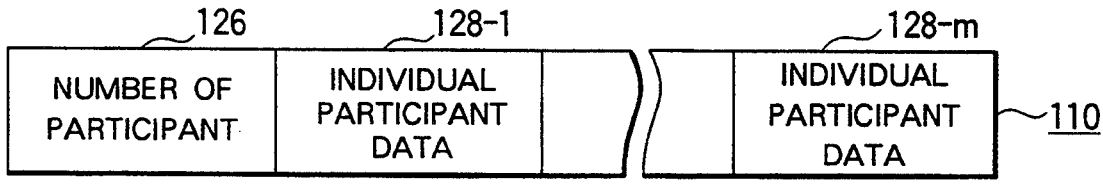
Figure 21:
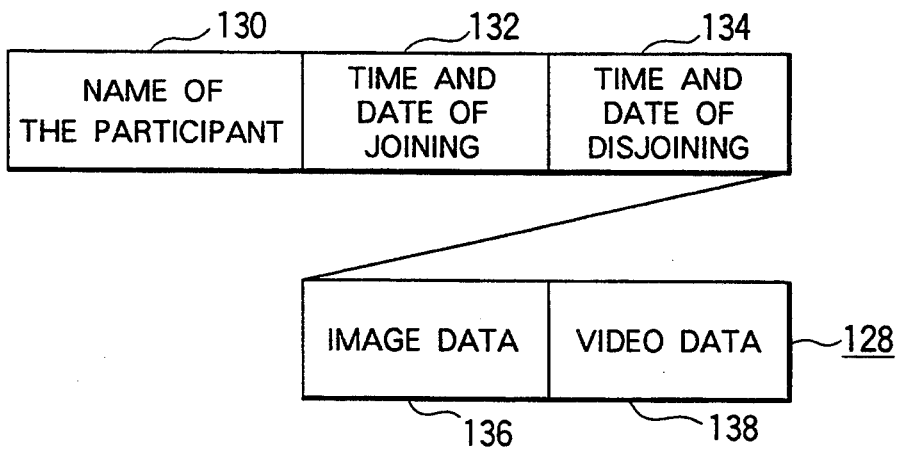

FIGS. 21A–21E show the details of the work identification data field 102. This field includes sub-fields of work name data 106, date and time data 108 and participant data 110, as shown in FIG. 21A. The work name data 106 is the name given to the group work, the date and time data 108 is when the group work is held, and the participant data 110 is the members of the group work.

FIG. 21B shows the details of the work name sub-field 106. This sub-field records the name of conference 112, additional name 114 and pattern data 116. The conference name 112 is the label which is affixed automatically to the conference window (title section) used for the group work, and the additional name 114 is a sub-name added arbitrarily by the user. The pattern data 116 is data for producing the icon of the conference window 6.

FIG. 21C shows the details of the date and time sub-field 108. The date and time data includes a date and time of access start 118, date and time of access end 120, date and time of work start 122, and date and time of work end 124. The access starting date and time 118 is when the conference window 6 is opened for the group work, i.e., when the conference control program is initiated. The access ending date and time 120 is when conference window 6 for the group work is closed, i.e., when the conference control program is terminated. The work starting date and time 122 is when the group work is started, i.e., when the logical communication paths to other participants are established, and the work ending date and time 124 is when the group work is completed, i.e., when the logical communication paths to other participants are disconnected.

FIG. 21D shows the details of the participant data sub-field 110. The participant data includes the number of participants 126 and individual participant data 128 of m sets at maximum. The number of participants 126 is the total count of participants who engage in the group work, and each individual participant data 28 is identification information of each participant and the details of participation.

FIG. 21E shows the contents of the individual participant data 128. This data includes a participant name 130, joining date and time 132, disjoining date and time 134, image data 136, and video data 138. The participant name 130 is the name of user of the workstation who joins the conference, the joining date and time 132 is when the user joins in the group work, the disjoining date and time 134 is when the user pulls out of the group work, and the image data 136 and video data 138 are to depict the participant.

Figure 22:
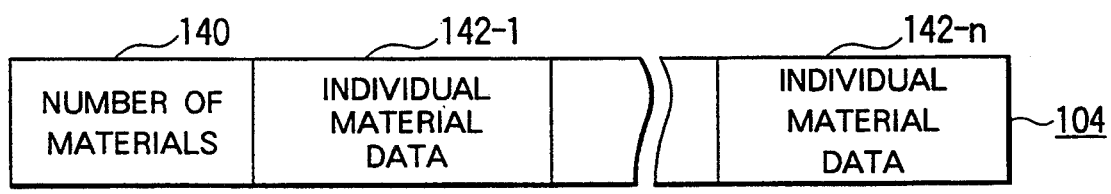
FIGS. 22A and 22B are diagrams used to explain the format of the work matter data table.
Figure 22:
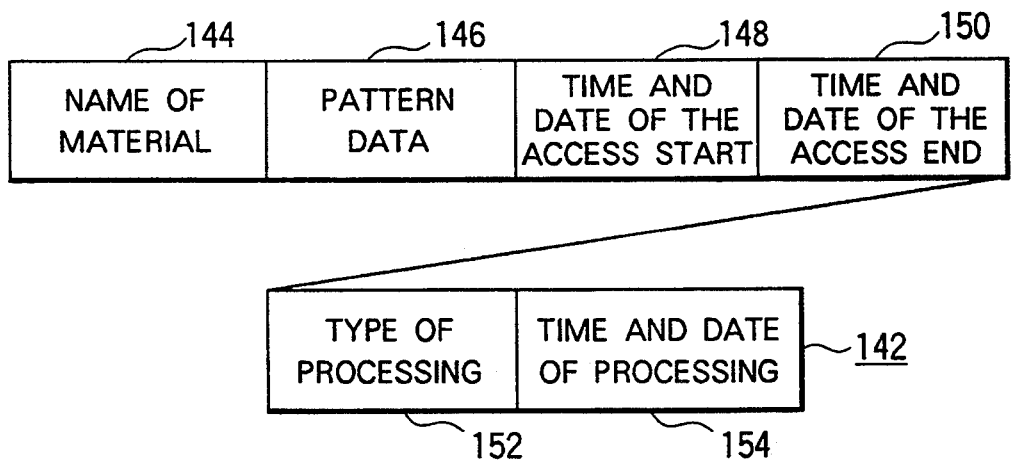

FIGS. 22A and 22B show the details of the work matter data field 104 shown in FIG. 20. This field includes sub-fields for the number of materials 140 and individual material data 142 of n sets at maximum, as shown in FIG. 22A. The number of materials 140 is the total count of the materials which are referenced during the group work, and each individual material data 142 is identification information of the material and its access detail.

FIG. 22B shows the details of the individual material data sub-field 142. The individual material data includes a material name 144, pattern data 146, access starting date and time 148, access ending date and time 150, operation type (transmission/reception/deletion) 152, and operating date and time 154. The material name 144 is the name of the material, the access starting date and time 148 is when the material is accessed in the group work, the access ending date and time 150 is when access to the material finishes in the group work, the operation type 152 is to distinguish the access mode to the material among transmission, reception and deletion, and the operation date and time 154 is when-access to the material finishes.

Figure 23:
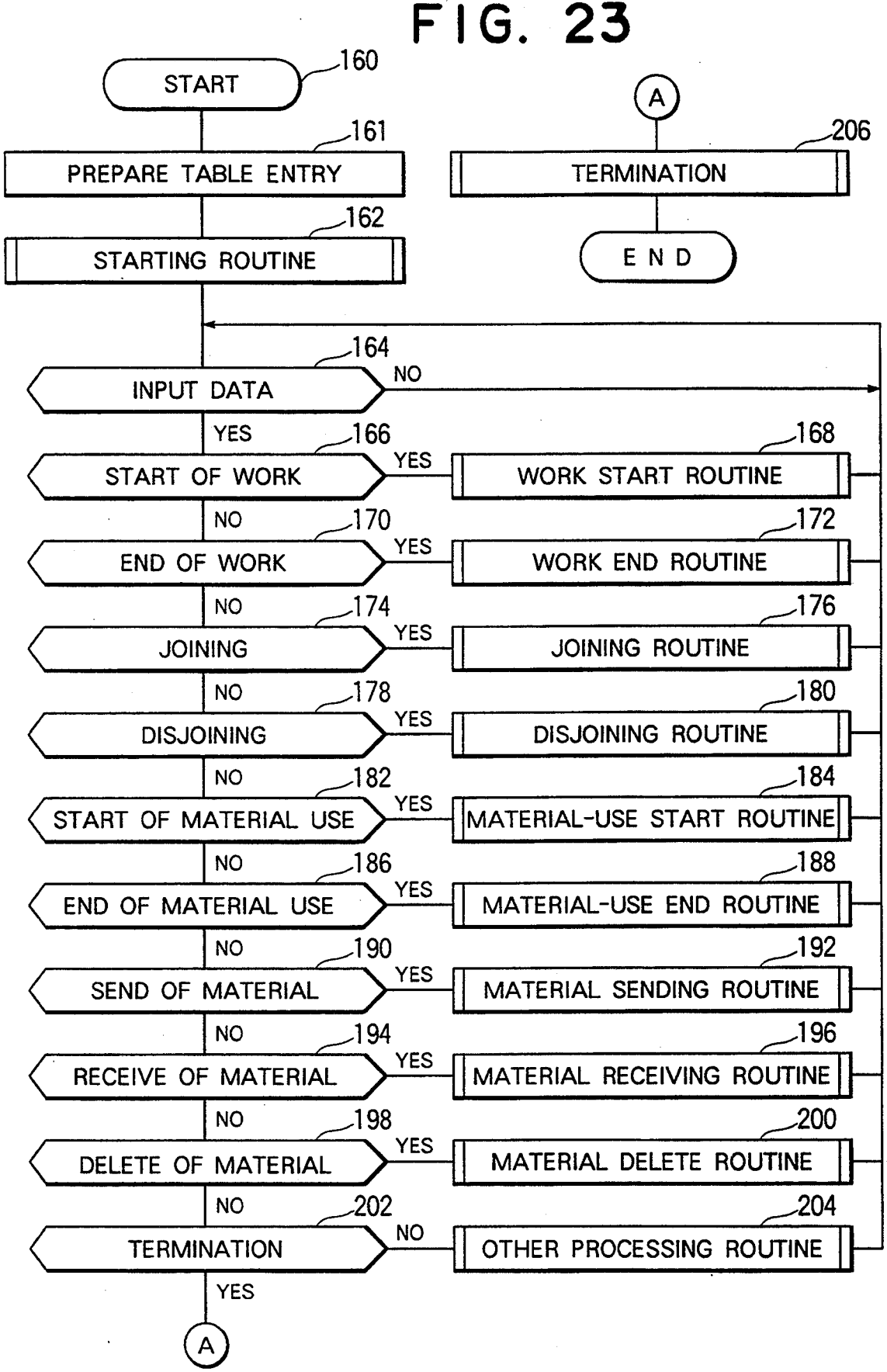
FIG. 23 is a flowchart of the main program according to the present invention.

FIG. 23 is a flowchart of the program 160 which produces the foregoing work information data table 100 in the group work database. The program 160 is a counterpart of the virtual user interference module 33, as shown in FIG. 5, and it receives the same input data as that received by the virtual user interference module 33.

Initially, a table entry is produced in the table 100 preparatory to the collection of work information pertinent to the group work (step 161). Next, the starting operation for recording the initiation of the conference control program 30 as the first step of the group work is held (step 162). Then, the system waits for the entry of input data by the user or from other conference control program 30' (step 164).

A program routine is executed in response to the input data: the work start routine 168 for "work start" command 166, the work end routine 172 for "work end" command 170, the joining routine 176 for "join" con, hand 174, the disjoining routine 180 for "disjoin" con, hand 178, the material use starting routine 184 for "material use start" command 182, the material use ending routine 188 for "material use end" command 186, the material transmission routine 192 for "material transmission" command 192, the material reception routine 196 for "material reception" command 194, the material deleting routine 200 for "material deletion" command 198, and the termination routine 206 for "termination" command 202. For input data other than any of the above-mentioned commands, the program execution proceeds to other operation routine 204.

Figure 24:
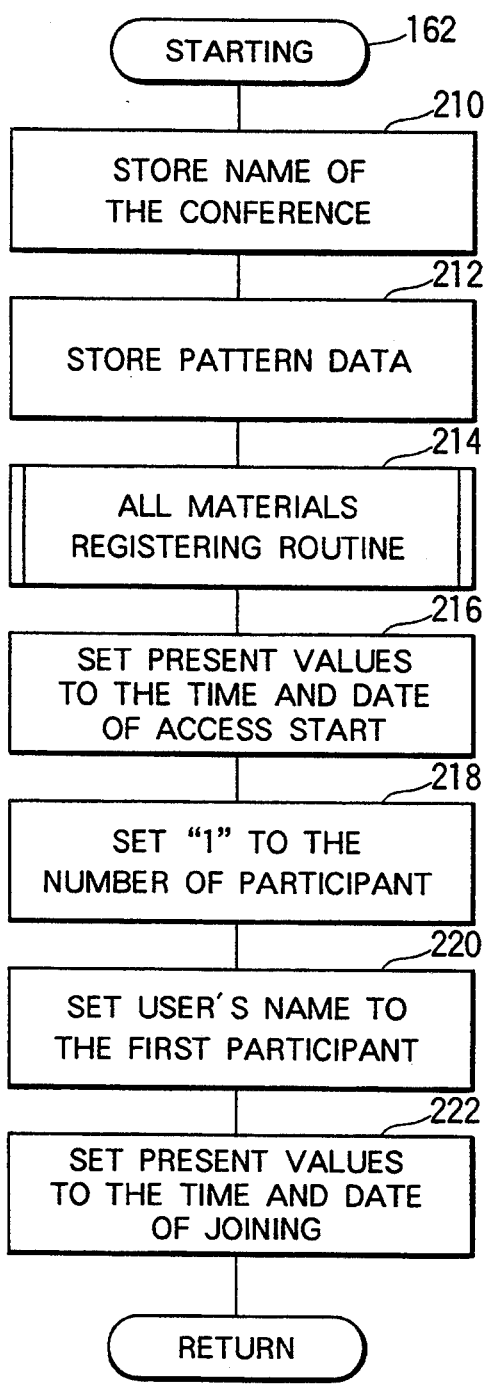
FIG. 24 is a flowchart showing in detail the starting routine 162 in FIG. 23.

FIG. 24 is a detailed flowchart of the starting routine 162 in FIG. 23. This routine sets the label of the conference window 6 used by the conference control program 30 to "name of conference" 112 in the "name of work" sub-field 106 (step 210), sets image data of the icon of the conference window 6 to "pattern data" 116 (step 212), registers all materials (resource icons) which exist in the conference window 6 at this time point into the work matter data 104 (step 214), sets the current date and time to "access starting date and time" 118 of the "date and time" sub-field 108 (step 216), sets "1" to "number of participants" 126 of the "participant" sub-field 110 (step 218), sets the name of operator to "participant name" 130 of the individual participant data 128-1 for the first participant (step 220), and sets the current date and time to "joining date and time" 132 (step 222). In the all-material registration step 214, even materials which will not be accessed are registered in the table, as will be explained for the reason later.

Figure 25:
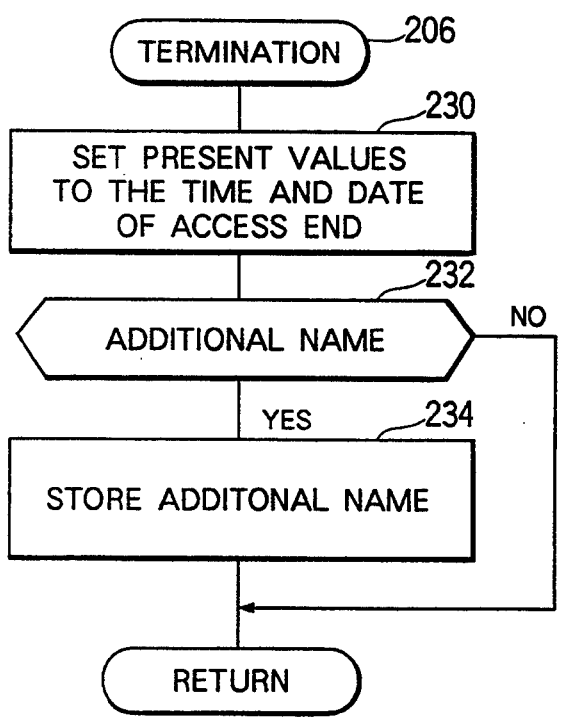
FIG. 25 is a flowchart showing in detail the termination routine 206 in FIG. 23.

FIG. 25 is a detailed flowchart of the termination routine 206 in FIG. 23. This routine sets the current date and time to "access ending date and time" 120 of the "date and time" sub-field 108 (step 230), and if the user requests the addition of a name other than that of "conference name" 112 (step 232), it sets the specified name to "additional name" 114 of the "work name" sub-field 106 (step 234).

Figure 26:
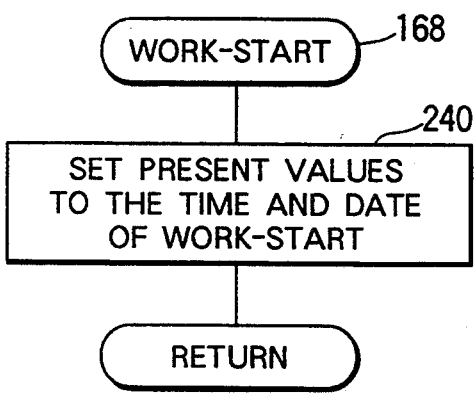
FIG. 26 is a flowchart showing in detail the work start routine 168 in FIG. 23.

FIG. 26 is a detailed flowchart of the work start routine 168 in FIG. 23. This routine sets the current date and time to "work starting date and time" 122 of the "date and time" sub-field 108 (step 240).

Figure 27:
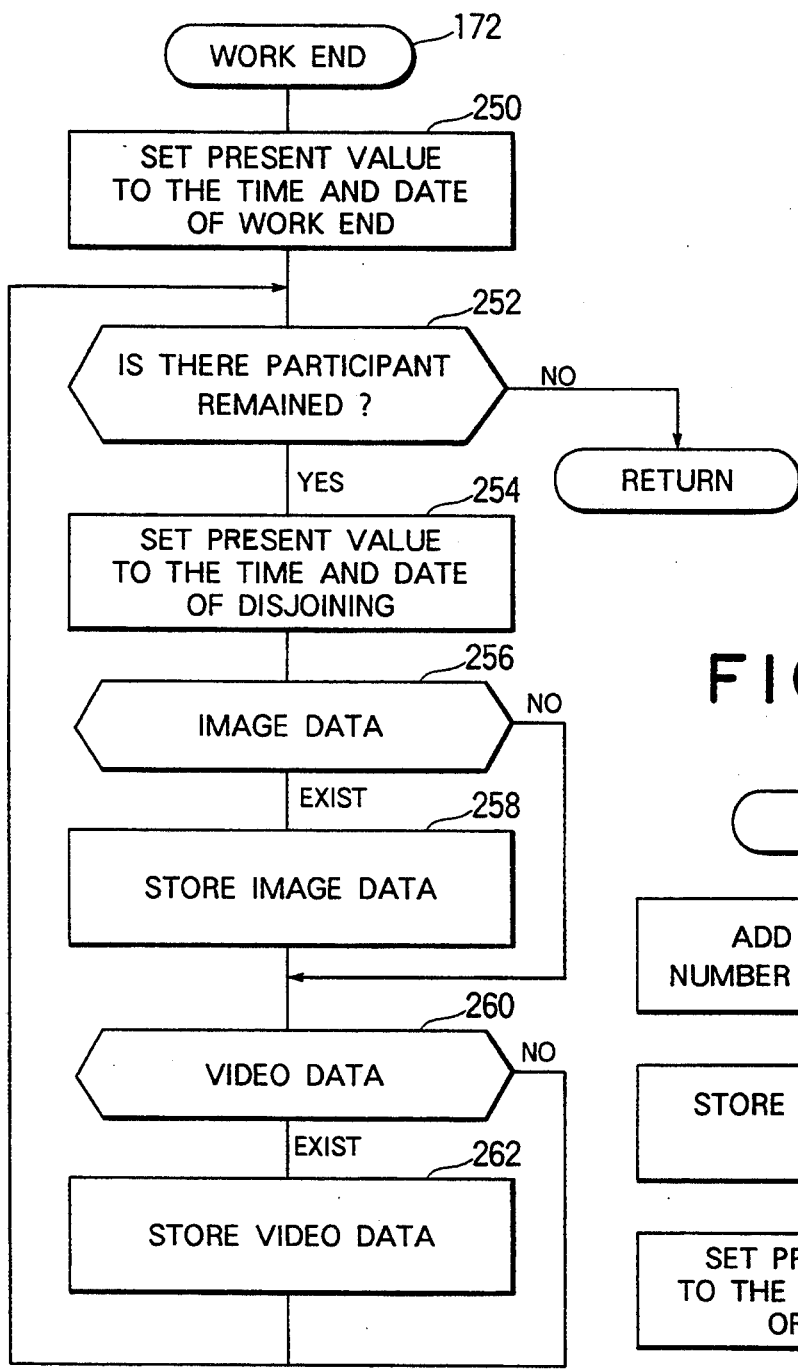
FIG. 27 is a flowchart showing in detail the work end routine 172 in FIG. 23.

FIG. 27 is a detailed flowchart of the work end routine 172 in FIG. 23. This routine sets the current date and time to "work ending date and time" 124 of the "date and time" sub-field 108 (step 250), and if there is any participant who has not yet pulled out of the work (step 252), it sets the current date and time to "disjoining date and time" 134 of the "individual participant data" 128 (step 254). If there exists image data or video data of the participant (step 256), the routine sets the image data to "image data" 136 or sets the video data to "video data" 138 (step 262).

Figure 28:
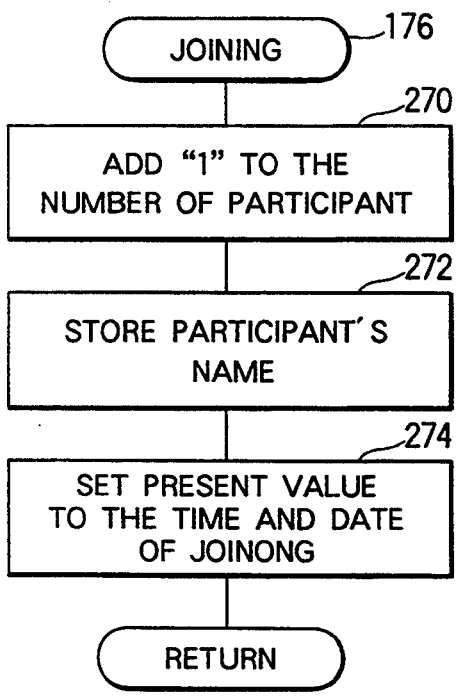
FIG. 28 is a flowchart showing in detail the joining routine 176 in FIG. 23.

FIG. 28 is a detailed flowchart of the joining routine 176 in FIG. 23. This routine increments the value of "number of participant" 126 of the "participant data" sub-field 110 (step 270), sets the name of a newly joining participant to "participant name" 130 of the "individual participant data" 128 created for the participant (step 272), and sets the current date and time to "joining date and time" 132 (step 274).

Figure 29:
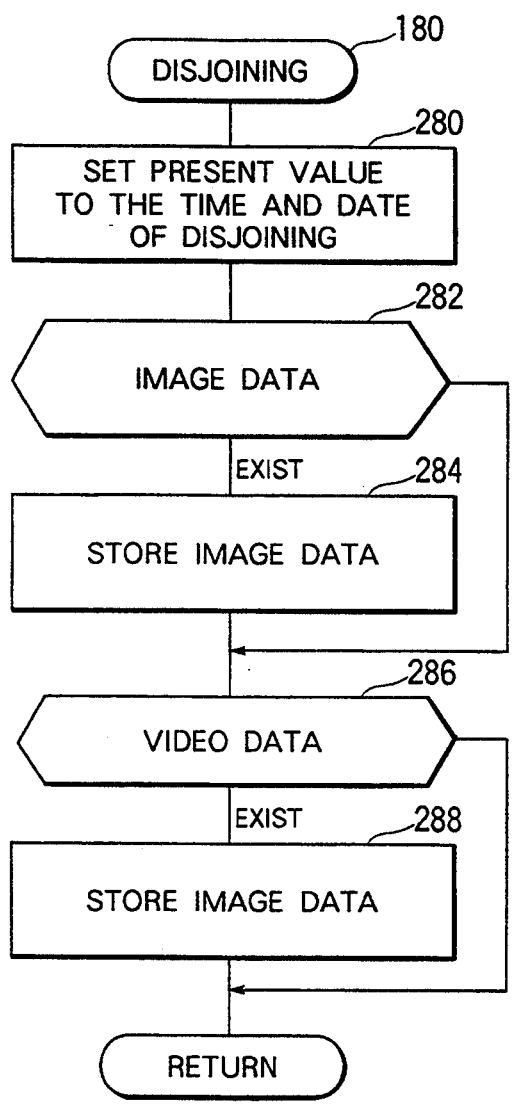
FIG. 29 is a flowchart showing in detail the disjoining routine 180 in FIG. 23.

FIG. 29 is a detailed flowchart of the disjoining routine 180 in FIG. 23. This routine sets the current date and time to "disjoining date and time" 134 of the "individual participant data" 128 relevant to the disjoining participant (step 280), and if image data or video data of the participant exists (step 282 or 286), it sets the image data to "image data" 136 or sets the video data to "video data" 138 (step 284 or 288).

Figure 30:
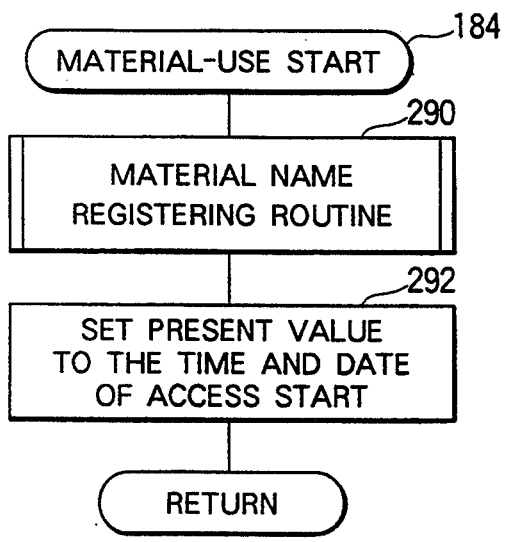
FIG. 30 is a flowchart showing in detail the material use starting routine 184 in FIG. 23.

FIG. 30 is a detailed flowchart of the material use starting routine 184 in FIG. 23. This routine makes the entry of "individual material data" 142 for the material in the "work matter data" field 104 (step 290), and sets the current date and time to "access starting date and time" 148 of "individual material data" sub-field 142 (step 292). The material name registration process 290 is implemented for the prevention of duplicate registration of materials, as will be explained later.

Figure 31:
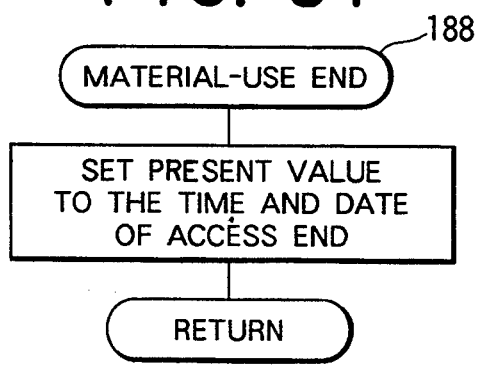
FIG. 31 is a flowchart showing in detail the material use termination routine 188 in FIG. 23.

FIG. 31 is a detailed flowchart of the material use ending routine 188 in FIG. 23. This routine sets the current date and time to "access ending date and time" 150 of the "individual material data" sub-field 142 relevant to the material (step 300).

Figure 32:
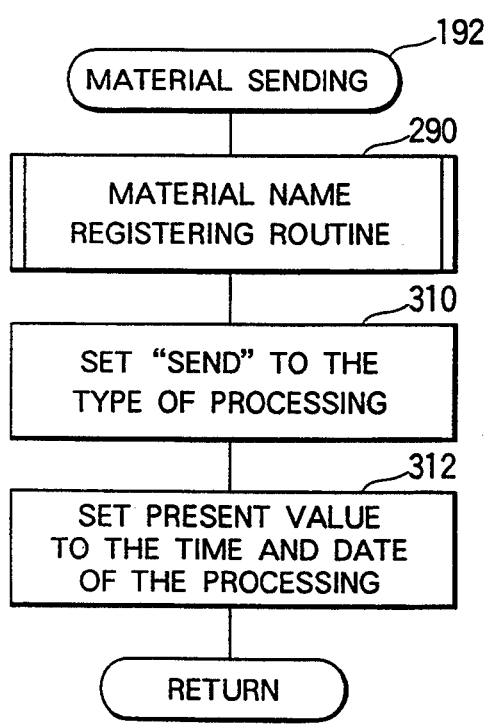
FIG. 32 is a flowchart showing in detail the material transmission routine 192 in FIG. 23.

FIG. 32 is a detailed flowchart of the material transmission routine 192 in FIG. 23. This routine makes the entry of "individual material data" 142 for the material in the "work matter data" field 104 (step 290), sets a code indicative of transmission in "operation type (transmission/reception/deletion)" 152 of the "individual material data" sub-field 142 (step 310), and sets the current date and time to "operating date and time" 154 (step 312).

FIG. 33 is a detailed flowchart of the material reception routine 196 in FIG. 23. This routine makes the entry of "individual material data" 142 for the material in the "work matter data" field 104 (step 290), sets a code indicative of reception in "operation type" 152 of the "individual material data" sub-field 142 (step 320), and sets the current date and time to "operating date and time" 154 (step 322).

FIG. 34 is a detailed flowchart of the material deletion routine 200 in FIG. 23. This routine makes the entry of "individual material data" 142 for the material in the "work matter data" field 104 (step 290), sets a code indicative of deletion in "operation type" 152 of the "individual material data" sub-field 142 (step 330), and sets the current date and time to "operating date and time" 154 (step 332).

FIG. 35 is a detailed flowchart of the all-material registration routine 214 in FIG. 24. This routine, if there is a material which has not yet registered in the "work matter data" field 104 (step 340), increments the value of "number of materials" 140 (step 342), makes the entry of "individual material data" 142 for the material (step 344), sets the name of the material to "material name" 144 and the pattern data (icon) to "pattern data" 146 of the entry 142 (step 348).

FIG. 36 is a detailed flowchart of the material registration routine 290 in FIG. 34. This routine, if the material which is requested to register is not yet registered in the "work matter data" field 104 (step 350), increments the value of "number of materials" 140 (step 352), makes the entry of "individual material data" 142 for the material (step 354), sets the name of the material to "material name" 144 and the pattern data (icon) to "pattern data" 146 of the entry 142 (step 358).

According to this invention, as described above, each time a group work is held, the group work data table 100 which contains the work identification data 102 for the work including the work name and its date and time and the work matter data 104 including the participant names and material names is stored cumulatively in the data-base automatically. Stored tables enable the user afterward to search for a group work based on any key item included in the work identification data 102 or a material used in the work based on any key item included in the work matter data 104. The program for searching group work data tables 100 stored in the database for intended data is prepared in each workstation as one of interaction programs (application programs) 34 shown in FIG. 5. This search program can readily by created by the conventional technique, and it is not described here.

It is appreciated from the above explanation that the present invention enables information retrieval based on ambiguous search keys memorized by the people as relations in the time or spatial domains, such as "one used in the conference in the afternoon of that day" or "one received in that conference", instead of using such search keys as material names or material numbers which are difficult for the people to remember.

We claim:

1. A method of storing collaboratively processed information referenced in a group work carried out through a computer network system in which a plurality of terminal units are interconnected through a network, each terminal unit comprising a microprocessor provided with a control program for controlling communication of control commands and data with other terminal units, a data base producing program for automatically producing a data set indicative of features of the group work and at least one application program for performing data processing according to control commands and data supplied through said control program a display unit and an input unit, and a plurality of users in remote places engaged in the group work by referring to at least one material displayed equally on a screen of the display unit of each terminal unit under control of said control program, said method comprising steps of:

establishing in said network a logical communication path for connecting a plurality of control programs of said terminal units, and starting the group work;

creating group work identification data by said data base creating program in response to a predetermined control command supplied from said control program when the group work is started;

selectively creating, by said data base creating program, work matter data indicative of index information for retrieving a material referenced in the group work when control command or data is supplied from said control program during the group work; and storing said work matter data in association with said work identification data in a file by said data base creating program.

2. The collaboratively processed information storing method according to claim 1, wherein said group work identification data comprises data indicative of a name of the group work and data indicative of a date or a date and time when the group work is held.

3. The collaboratively processed information storing method according to claim 2, wherein said group work identification data further comprises names of participants who engage in the group work.

4. The collaboratively processed information storing method according to claim 2, wherein said data of group work name is data of a name which is given to the window, in which said group work is held, created on a screen of said display units.

5. The collaboratively processed information storing method according to claim 2, wherein said group work identification data further comprises information for identifying a work which is specified arbitrarily by a user.

6. The collaboratively processed information storing method according to claim 1, wherein said group work matter data comprises data indicative of a name of a material which is used in said group work.

7. The collaboratively processed information storing method according to claim 6, wherein said group work matter data further comprises data indicative of a time when said material is referenced.

8. The collaboratively processed information storing method according to claim 6, wherein said group work matter data further comprises information for distinguishing whether said material is one which is sent to an other terminal unit or one which is received from the other terminal unit.

9. A method of storing group work information referenced in a group work carried out through a computer network system in which a plurality of terminal units are interconnected through a network, each terminal unit comprising a display unit having a display screen, an input unit, a processor provided with a control program for implementing communication among said terminal units so that a plurality of terminal units operate in unison for information processing in response to input operation on said input units, and a telephone set, and a plurality of participants in remote places engage in a group work by using group work information displayed on the display screens and voices through said telephone sets, said method comprising steps of:

forming, on the display screen, a group work environment carrying out the group work;

creating work identification data for identifying the group work environment formed on the display screen;

selectively creating work matter data indicative of index information for retrieving a material referenced in the group work, in response to user operations taken in the group work environment; and storing said work matter data in association with said work identification data in a data file for future information retrieval of said material.

10. The group work information storing method according to claim 9, wherein said work identification data comprises data of a name which is given to the group work environment formed on the display screen and data of a date or a date and time when the group work is held.

11. The group work information storing method according to claim 10, wherein said work identification data further comprises data of the names of participants who engage in the group work environment.

12. The group work information storing method according to claim 9, wherein said work identification data comprises auxiliary information defined by a user.

13. The group work information storing method according to claim 9, wherein said display unit comprises a multi-window function, the group work environment being formed as one of multiple windows on the display screen, and wherein name data given to said multiple windows is adopted as said work identification data.

14. The group work information storing method according to claim 9, wherein said terminal unit has a function of displaying a plurality of icons or images, which correspond to participants of the group work, on the display screen, and said work identification data comprises icons or images of the participants.

15. The group work information storing method according to claim 9, wherein said work matter data comprises a name of the material which is used in the group work environment.

16. The group work information storing method according to claim 15, wherein said group work matter data comprises information for distinguishing whether the material used in the group work environment is one which is sent to an other terminal unit or one which is received from an other terminal unit.

17. A method of storing and retrieving group work information referenced in a group work carried out through a computer network system in which a plurality of terminal units are interconnected through a network, each terminal unit comprising a display unit having a display screen, an input unit, a processor provided with a control program for implementing communication among said terminal units so that said terminal units operate in unison for information processing in response to input operations on said input units, a telephone set, and file means for storing group work information, and a plurality of participants in remote places engaged in the group work by using information displayed on the display screens and voices through said telephone sets, said method comprising steps of:

forming, on the display screen, a group work environment for carrying out the group work;

creating work identification data for identifying the group work environment formed on the display screen;

creating work matter data indicative of index information for retrieving a material referenced in the group work, in response to a certain user operation taken in the group work environment;

storing said work matter data in association with said work identification data in said file means for future information retrieval; and searching the file means for a set of work identification data and work matter data which fit a search condition specified by a user and displaying the data on the display screen.

18. The group work information storing and retrieving method according to claim 17 comprising a step of displaying a pattern indicative of the group work environment in a pictorial fashion based on retrieved work matter data.

19. The group work information storing and retrieving method according to claim 17 comprising a step, which is in response to a display request for a material corresponding to one of work identification data that fits a search condition entered by a user through said input unit and displayed on the display screen, of displaying a content of the material on the display screen.

20. The group work information storing and retrieving method according to claim 18 comprising a step, which is in response to a display request for a material, of displaying graphical data representing said material on the display screen, a content of the material corresponding to graphical data selected by a user being displayed on said display screen.

21. A terminal unit for used in a computer network system in which a plurality of terminal units are interconnected through a network so that a plurality of users in remote places engage in a group work by making reference to at least one visual material displayed equally on each display screen of the terminal units, comprising:

display means for presenting information through a plurality of windows created on the display screen;

input means for selectively inputting command and data in one of said windows by a user;

processor means coupled with said display unit and said input unit, for selectively executing one of a plurality of application programs to change information displayed in one of said windows on each display screen in response to a command or data input from said input means; and data file means for storing various document data and group work information;

said processor means being provided with:

group work control means for controlling communication of commands and data with other of the terminal units so that the plurality of terminal units carry out information processing in unison when an input operation occurring at one of said terminal units for a specific window of a group work environment;

means for selectively creating work identification data indicative of the group work environment and index data for retrieving document data referred in the group work, in response to input operations for the specific window, and storing the index data in association with the work identification data into said data file means; and means for retrieving index data from said data file in accordance with work identification data specified by a user, and displaying the index data on the display screen.

* * * * *

UNITED STATES PATENT AND TRADEMARK OFFICE
CERTIFICATE OF CORRECTION

PATENT NO. : 5,363,507
DATED : November 8, 1994
INVENTOR(S) : Yoshiyuki Nakayama, et al.

It is certified that error appears in the above-indentified patent and that said Letters Patent is hereby corrected as shown below:

Claim 1, column 16, line 51, after "program" insert --,--.

Claim 21, column 19, line 15, delete "used" and substitute therefor --use--; and,
line 24, delete "command" and substitute therefor --commands--.

Signed and Sealed this

Twenty-seventh Day of December, 1994

*Attest:*

BRUCE LEHMAN

*Attesting Officer*     *Commissioner of Patents and Trademarks*